US011593902B2

(12) United States Patent
Posillico et al.

(10) Patent No.: US 11,593,902 B2
(45) Date of Patent: *Feb. 28, 2023

(54) 3D PRINTER AND INVENTORY CONTROL AND DISTRIBUTION SYSTEM FOR 3D DESIGNS

(71) Applicant: Kaboodl, LLC, Wilmington, DE (US)

(72) Inventors: Francesco L. Posillico, Massapequa, NY (US); Timothy Allan Page, Reno, NV (US); Mason William Rowbottom, Todmorden (GB)

(73) Assignee: KaBooDL, LLC, Wilmington, DE (US)

( * ) Notice: Subject to any disclaimer, the term of this patent is extended or adjusted under 35 U.S.C. 154(b) by 271 days.

This patent is subject to a terminal disclaimer.

(21) Appl. No.: 17/083,538

(22) Filed: Oct. 29, 2020

(65) Prior Publication Data
US 2021/0110494 A1   Apr. 15, 2021

Related U.S. Application Data

(63) Continuation of application No. 16/523,022, filed on Jul. 26, 2019, now Pat. No. 10,846,808, which is a
(Continued)

(51) Int. Cl.
*G06Q 50/18*       (2012.01)
*G06F 16/27*       (2019.01)
(Continued)

(52) U.S. Cl.
CPC ....... *G06Q 50/184* (2013.01); *G05B 19/4099* (2013.01); *G06F 16/137* (2019.01);
(Continued)

(58) Field of Classification Search
CPC .... G06Q 50/184; G06Q 20/367; G06F 16/27; G06F 16/137; G05B 19/4099
See application file for complete search history.

(56) References Cited

U.S. PATENT DOCUMENTS 6,282,654 B1   8/2001  Ikeda
6,314,409 B2  11/2001  Schneck
(Continued)

FOREIGN PATENT DOCUMENTS

CN      106776431       5/2017
EP      2701090 A1  *  2/2014   ............. G06F 21/10
(Continued)

OTHER PUBLICATIONS

Yamato, Yoji et al., (2016). "Proposal of Real Time Predictive Maintenance Platform with 3D Printer for Business Vehicles," arxiv.org, Cornell University Library, 201 Olin Library, Cornell University, Ithaca, NY 14853, Nov. 30, 2016, XP081396788.
(Continued)

*Primary Examiner* — Shanto Abedin
(74) *Attorney, Agent, or Firm* — Thomas A. O'Rourke; Bodner & O'Rourke, LLC

(57) ABSTRACT

A digital platform enables 3D printing where the designs are protected from piracy/redistribution. A single board computer (SBC) communicates with a first server and a second server. The SBC requests a unique hardware ID from the first server, which assigns and sends the ID to the SBC. The SBC submits the ID and a secret key to the second server to request registration of a user and a printer, and the second server sends private certs, a client ID, and a unique public identifier to the SBC. The second server also receives and stores 3D print designs through a designer portal, and on-demand displays the designs in a GUI screen. The SBC user may purchase a 3D print design, and the second server, in response, sends an access token to the SBC. The SBC redeems the access token for a selected 3D print, and the second server adjusts geode for the selected 3D design for the particular printer, and streams the adjusted geode to the
(Continued)

printer through the SBC, thereby protecting the code from unauthorized user/replication.

10 Claims, 24 Drawing Sheets

Related U.S. Application Data continuation-in-part of application No. 15/842,083, filed on Dec. 14, 2017, now Pat. No. 10,546,105.

(60) Provisional application No. 62/703,549, filed on Jul. 26, 2018, provisional application No. 62/433,907, filed on Dec. 14, 2016.

(51) Int. Cl.
*G05B 19/4099* (2006.01)
*G06F 16/13* (2019.01)
*G06Q 20/36* (2012.01)

(52) U.S. Cl.
CPC .......... *G06F 16/27* (2019.01); *G06Q 20/367* (2013.01); *G05B 2219/49007* (2013.01)

(56) References Cited

U.S. PATENT DOCUMENTS

| | | |
|---|---|---|
| 6,378,070 B1 | 4/2002 | Chan |
| 6,463,538 B1 | 10/2002 | Elteto |
| 6,681,212 B1 | 1/2004 | Zeng |
| 6,904,527 B1 | 6/2005 | Parlour |
| 7,111,285 B2 | 9/2006 | Smith |
| 7,155,415 B2 | 12/2006 | Russell |
| 7,627,119 B2 | 12/2009 | Bussert |
| 7,782,190 B1 | 8/2010 | Martin |
| 7,868,899 B2 | 1/2011 | Fenney |
| 7,872,772 B2 | 1/2011 | Caffary |
| 8,245,306 B2 | 8/2012 | Gimenez |
| RE43,936 E | 1/2013 | Isaacson |
| 8,412,588 B1 | 4/2013 | Bodell |
| 8,970,867 B2 | 3/2015 | Baldwin |
| 9,073,259 B2 | 7/2015 | Dufort |
| 9,558,330 B2 | 1/2017 | Pogorelik |
| 9,595,037 B2 | 3/2017 | Glasgow |
| 9,626,487 B2 | 4/2017 | Jung |
| 10,063,529 B2 | 8/2018 | Milazzo |
| 10,204,178 B2 | 2/2019 | Wegner |
| 10,216,738 B1 | 2/2019 | Cronin |
| 10,245,821 B2 | 4/2019 | Pratt |
| 10,513,077 B2 | 12/2019 | Mattingly |
| 2003/0018895 A1 | 1/2003 | Morrison |
| 2009/0164379 A1 | 6/2009 | Jung |
| 2012/0092724 A1 | 4/2012 | Pettis |
| 2014/0058959 A1 | 2/2014 | Isbjornssund |
| 2015/0134955 A1 | 5/2015 | Lacaze |
| 2015/0221053 A1* | 8/2015 | Tapley .................. G06F 3/1222 705/310 |
| 2015/0332058 A1 | 11/2015 | Chen |
| 2016/0098723 A1 | 4/2016 | Feeney |
| 2016/0364553 A1 | 12/2016 | Smith |
| 2017/0206523 A1 | 7/2017 | Goeringer et al. |
| 2017/0279783 A1* | 9/2017 | Milazzo ................. B33Y 50/00 |
| 2017/0372284 A1* | 12/2017 | Levy ...................... G06F 30/00 |
| 2018/0012311 A1 | 1/2018 | Small |
| 2018/0257306 A1 | 9/2018 | Mattingly |
| 2018/0285879 A1 | 10/2018 | Gadnis |
| 2019/0080392 A1* | 3/2019 | Youb ....................... G06F 21/64 |
| 2019/0134910 A1* | 5/2019 | Casey .................. G06F 21/608 |
| 2019/0180291 A1 | 6/2019 | Schmeling |

FOREIGN PATENT DOCUMENTS

| | | |
|---|---|---|
| EP | 3 156 926 | 4/2017 |
| EP | 3 226 165 A1 | 10/2017 |
| EP | 3 432 178 | 1/2019 |
| KR | 101767959 | 8/2017 |
| WO | WO 2015/077077 | 11/2013 |
| WO | WO 2019/002687 | 1/2019 |

OTHER PUBLICATIONS

Pinshape: Find, Share and Sell 3D Print Files; Dec. 1, 2017; available at: https://pinshape.com/.
Trinpy—We provide guaranteed printable designs for your desktop 3D printer; Dec. 1, 2017; available at: https://www.trinpy.com/.
3dFilemarket.com A Growing 3D printing community; Dec. 1, 2017; available at: https://www.3dfilemarket.com/.
"What is Hashing? [Step-by-Step Guide—Under the Hood of Blockchain]", available at: https://blockgeeks.com/guides/what-is-hashing/, Jul. 24, 2019.
Wade, T.J. & Subramanya, S.R., (2016). Digital Rights Management in 3D Printing: A Proposed Reference Architecture for Design-to-Fabrication Security and Licensing, International Conference on Breakthrough in Engineering, Science & Technology—2016 (INCBEST'16).
Teslya, Nikolay & Ryabchikov, Igor, (2020). Blockchain-Based Platform Architecture for Industrial IoT, Proceeding of the 21st Conference of Fruct Association ISSN 2305-7254.

* cited by examiner

3D Printing: How it works

1. Single Board Computer

- Customers can browse through different 3D model available for print
- All 3D models are uploaded by designers through an independent designer web portal
- User can purchase a model and print it

3D Printing: How it works

2. Intigo Desktop App

- Independent desktop application available for different platforms including OS X, Microsoft Windows
- Customers can browse through different 3D model available for print on the website or through the full version of the App

FIG. 5
Single Board Computer: Registration

- When device is manufactured and prepared for Market. It should first complete a device registration process
- The device should call an internal server and get a unique hardware id for the device
  attacks ar

- Once a unique id is received at the device, the device should call the central Intigo server along with a secret key known to the devices only, to register itself as an available device. The central server returns private key certs, client ID and a unique public identifier

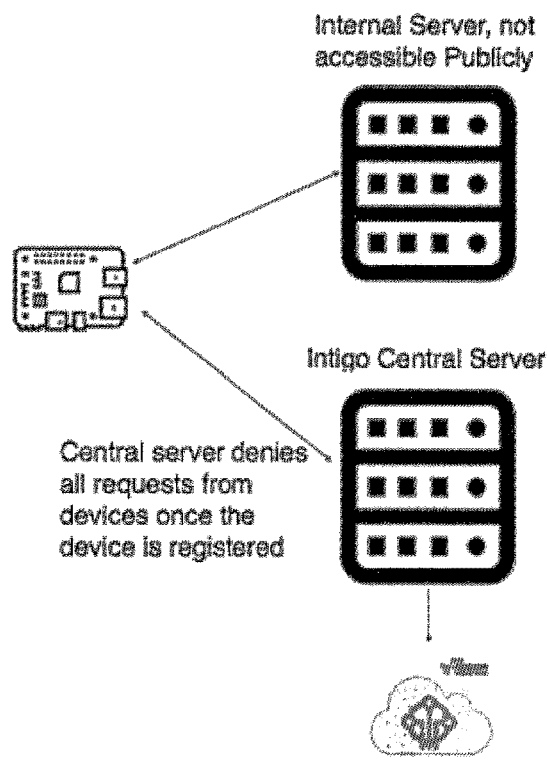

FIG. 6
Single Board Computer: Registration

- Central server exposes a public API for devices which can be accessed over a secure channel
- API takes secret key, hardware id to validate the request and process the registration on AWS IOT devices gateway
- API returns the private key certs, client id and unique public identifier which will be stored permanently on the device

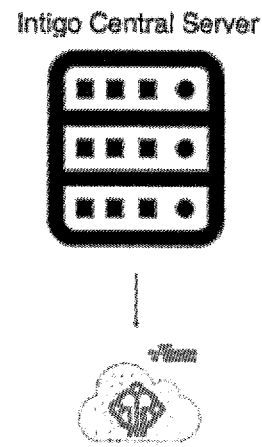

Intigo Central Server

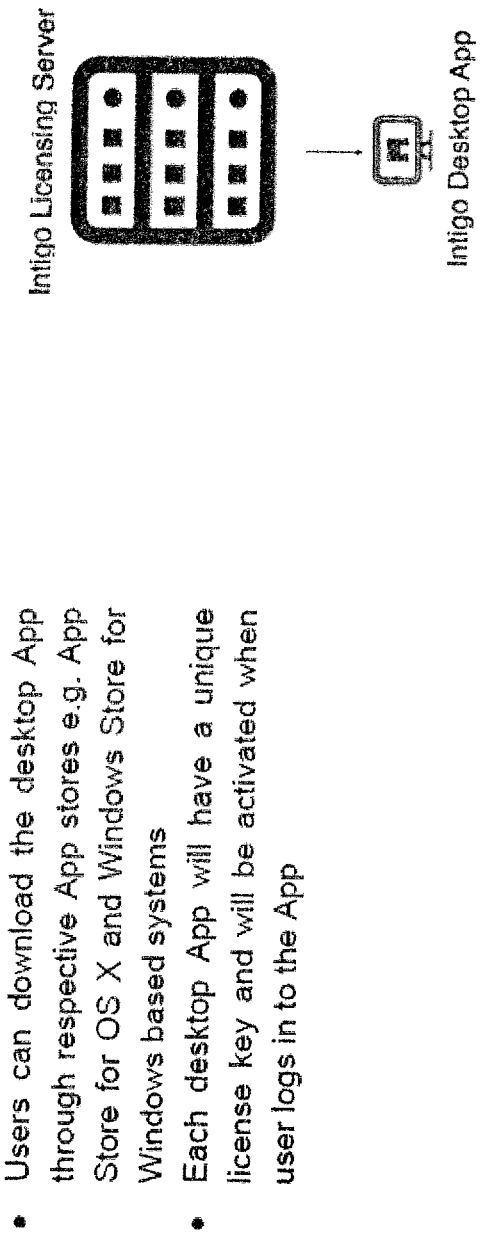

FIG. 8

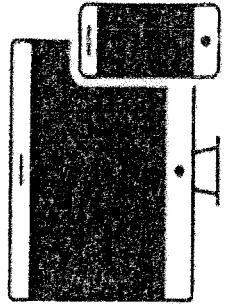

3D Models

- All the 3D models are upload by designers through a dedicated designer web portal. Designers can register on the portal through an invite or by accessing the portal and sign up using email address
- Users can browse through available 3D models through a Website from their personal computers, laptops or mobile device or through a platform specific Mobile App e.g. iOS App, Android App, Windows 10 App
- User can view details of each 3D model; the details will include 3D view of the model, image gallery of the model from different angles. User can also select the models for Print from the model detail screen. To print a model users must be logged into the user.

FIG. 9

Single Board Computer: User Registration

- Once device is purchased by the user, user should connect the device with their registered Intigo account
- User can use the unique public identifier and enter the identifier through web portal to connect the device, this process can also be achieved by printing a QR code on device with embedded identifier so users won't have to manually add the code.

Single Board Computer Connectivity

- The Single Board Computer (SBC) device implements IOT device sdk in the device or use Python libraries to constantly listen for new notifications through internet over MQTT protocol

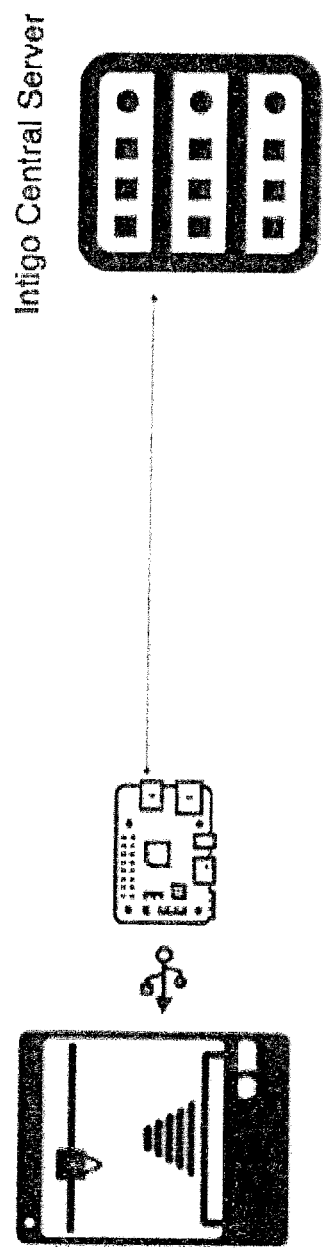

FIG. 12
Intigo Desktop App: Connectivity

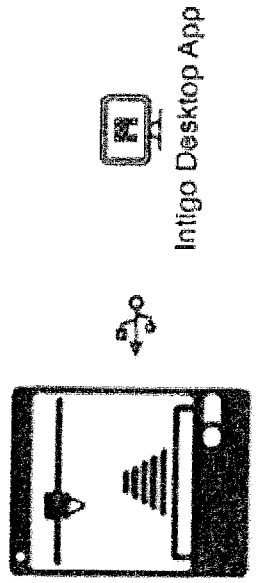

Intigo Desktop App

- The Desktop App contains a full version and a light version running as a service and can be accessed through toolbar/status bar and starts on each boot up of the desktop. This will always be running in the background even if the full version of the App is not running on user's desktop. The App implements a Push notification system to get notifications from the Intigo Server.

FIG. 13
Intigo Desktop App: Printable file

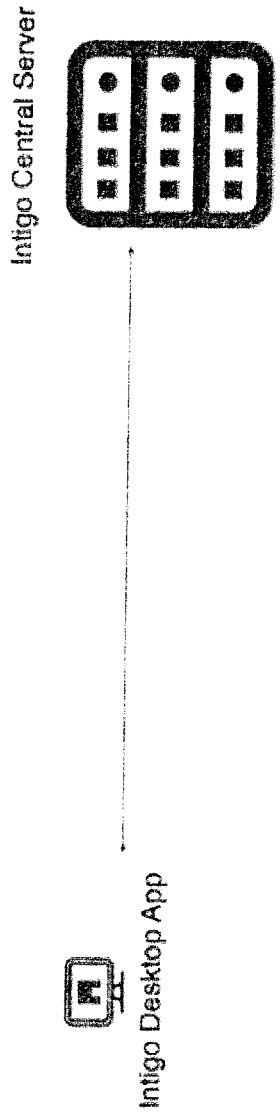

- Once print notification is received on the App along with a single-time access token, the device communicates with Intigo central server over HTTPS protocol using a secure public API
- Central server returns the printable file to the device over a secure channel and also sends all the user selected configurations for gCode generation and if gCode file is available it will send a link to the downloadable gCode file

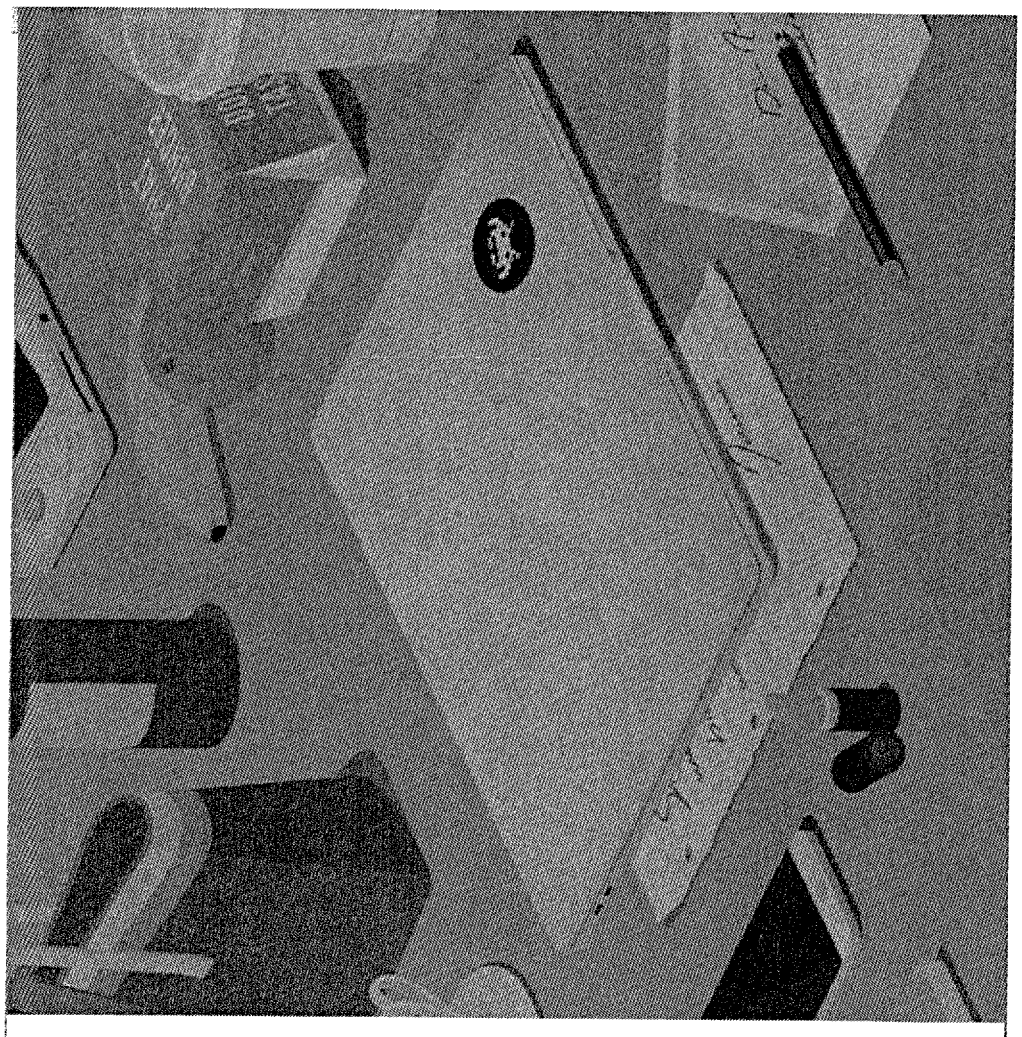
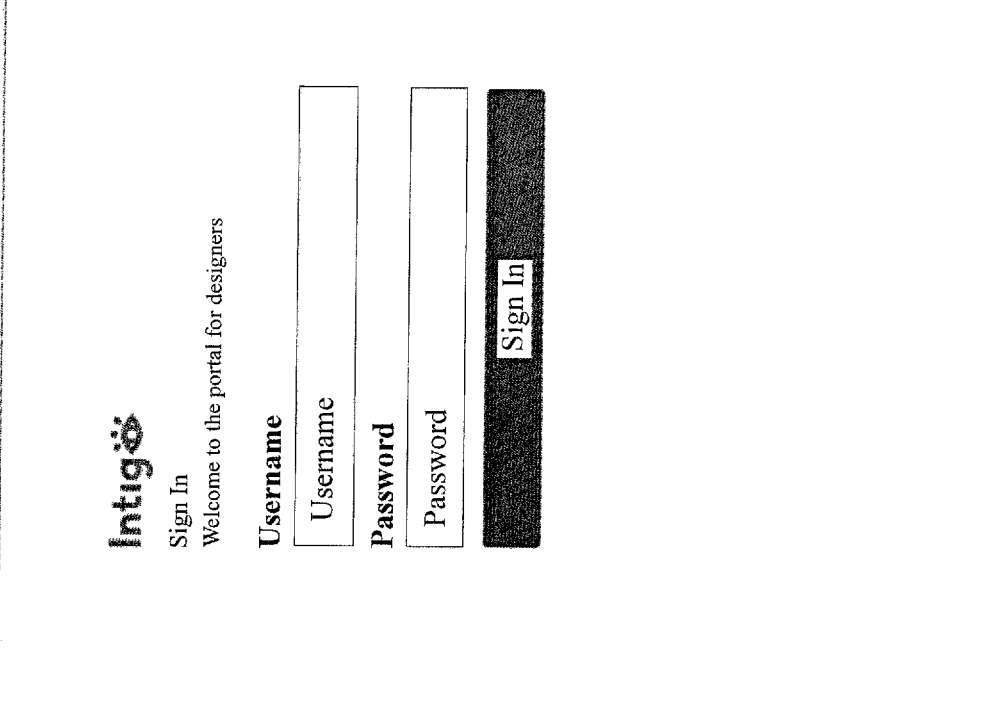
FIG. 19

3D PRINTER AND INVENTORY CONTROL AND DISTRIBUTION SYSTEM FOR 3D DESIGNS

CROSS REFERENCES TO RELATED APPLICATIONS

This application is a continuation of U.S. application Ser. No. 16/523,022, filed on Jul. 26, 2019, which claims priority on U.S. Provisional Application Ser. No. 62/703,549, filed on Jul. 26, 2018 and which is also a continuation in part of U.S. application Ser. No. 15/842,083, filed on Dec. 14, 2017, now issued as U.S. Pat. No. 10,546,105, and U.S. application Ser. No. 15/842,083 claims priority on U.S. Provisional Application Ser. No. 62/433,907, filed on Dec. 14, 2016, all disclosures of which are incorporated herein by reference.

FIELD OF THE INVENTION

The present invention relates to improvements in 3D printing and 3D designs that may be downloaded and printed on a 3D printer, and more particularly to apparatus, systems, and a method for protecting such 3D designs when distributed to purchasers in retail or online store environments.

BACKGROUND OF THE INVENTION

Three-dimensional (3D) printing, also referred to as additive manufacturing, is a process in which successive layers of a material, commonly plastic, are deposited to form a three-dimensional object. The definition for the 3D object typically resides in digital data, which may originate as a three-dimensional computer aided design (i.e., solid "digital" models) of the object, or may be derived from a 3D scan of the actual object. The digital surface definition for the object is typically stored in the STL (stereolithography) file format that is native to CAD software developed by 3D Systems, Inc. and is used by the 3D printer to manufacture the object.

Injection molding tends to be less expensive for the production of greater quantities of an object. However, 3D printing is faster, and is more cost-effective where relatively few parts are desired/printed, which is common for the prototyping and proof-of-concept required for development of new designs, and also for the consumer 3D printing community and marketplace (see e.g., Pinshape: Free 3D Printable Files and Designs; Trinpy; Guaranteed Printable Designs for your Desktop 3D Printer; and 3dFilemarket.com A Growing 3D printing Community).

Few of the available repositories of 3D Printable Designs charge a fee for the downloading of its digital data. One of the drawbacks of charging a fee for such downloads is that once the source code has been obtained, the person who made the purchase now has possession of the code and can print as many copies as desired. Moreover, the one-time purchaser could even remarket the design, perhaps even without the use of public advertising, so that the designer may never become aware of the violation of the copyright in his/her original work. Software that is made readily available may enter the public domain.

To counteract piracy, and help enforce copyrights associated with software and other works, Digital Rights Management (DRM) schemes are developed and deployed in the form of access control technologies. One of the oldest versions of DRM is the product key required for the installation of software on a computer. Newer types of DRM are used to limit the alteration and unauthorized copying/distribution of e-books. See also, Wade, T. J. & Subramanya, S. R. Digital Rights Management in 3D Printing: A Proposed Reference Architecture for Design-to-Fabrication Security and Licensing, International Conference on Breakthrough in Engineering, Science & Technology-2016 (INC-BEST'16), 2016).

The general provision of a system for copying data and limiting the extent of such copying has only been partially addressed in the prior art, as shown by the following: U.S. Pat. No. 6,282,654 to Ikeda; U.S. Pat. No. 6,463,538 to Elteto; U.S. Patent App. Pub. No. 2003/0018895; U.S. Pat. No. 6,681,212 to Zeng; U.S. Pat. No. 6,782,190 to Morito; U.S. Pat. No. 6,904,527 to Parlour; U.S. Pat. No. 7,111,285 to Smith; U.S. Pat. No. 7,155,415 to Russell; U.S. Pat. No. 7,130,831 to Howard; U.S. Pat. No. 7,627,119 to Bussert; U.S. Pat. No. 7,868,899 to Fernery; and U.S. Pat. No. RE43,936 to Isaacson. See also, U.S. Pat. No. 8,234,715 to Zollinger, and U.S. Pat. No. 9,699,519 to Watson.

However, an improved security system is thus necessary for the secure distribution of a digital 3D print file. The present invention provides several solutions to overcome drawbacks of the prior art, and which serve to protect the intellectual property of 3D designers.

OBJECTS OF THE INVENTION

It is an object of the invention to provide apparatus and a method of protecting 3D printable designs from unauthorized printing.

It is another object of the invention to provide an app store from which 3D designs are downloadable for printing, but only according to a defined print/usage limit, and with the source code being protected from piracy.

It is a further object of the invention to provide an app store from which 3D designs are downloadable for printing, and which deletes the source code after a pre-determined time period.

It is another object of the invention to provide an app store from which 3D designs are downloadable for printing, and which deletes the source code after a pre-determined number of prints are made therefrom.

It is also an object of the invention to provide a new 3D printer that is configured to accept a unique print card that may control the printing of 3D designs therefrom.

It is also an object of the invention to provide a new 3D printer that is configured with a digital rights management system, in which Blockchain may track and control the printing of 3D designs on that printer, using an embedded hash in a print file and a sent hash from an API.

It is also an object of the invention to provide a digital rights management system that may cooperate with existing 3D printers, in which Blockchain may track and control the printing of 3D designs on that printer over the internet, using an embedded hash in a print file and a hash sent from an API, which must be compared and matched for the printer to proceed.

Further objects and advantages of the invention will become apparent from the following description and claims, and from the accompanying drawings.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Apparatus and a method are disclosed to protect the source codes (STL FILE) that interacts with a CAD or 3D printer head operating system. The method contains three categories of storing the source codes (STL) into codes that delete while printing, codes that remain on the device and cannot be redistributed, and codes that have a ticker (codes that delete in a time range or after a specific number of usages). This method solves a problem with the existing 3D print industry with the piracy of their design codes, and allows for protecting of the IP of the design. By doing this we can store existing brands because we can protect the design codes from being redistributed. Designers are beginning to protect the designs they print, and the apparatus and method disclosed herein seeks to protect those designs from illegal redistribution. With the disclosed apparatus and/or method, the codes are protected according to those three categories because it allows for brands to sell their products, and correspondingly allows the customer to print the object according to the restrictions imposed by the purchased category. Therefore, designers and businesses can market special designs according to a time limit, or based on an exact number or printable copies, after which the code is removed from the customer's storage device (e.g., RAM, hard drive, etc.).

BRIEF DESCRIPTION OF THE DRAWINGS

The description of the various example embodiments is explained in conjunction with appended drawings, in which:

FIG. 5 illustrates a first series of registration steps for a single board computer in accordance with the present invention;

FIG. 6 illustrates a second series of registration steps for a single board computer in accordance with the present invention;

FIG. 7 illustrates a series of registration steps for a desktop app. in accordance with the present invention;

FIG. 8 illustrates and defines steps in the 3D printing process in accordance with the present invention;

FIG. 9 illustrates further steps in the registration process in accordance with the present invention;

FIG. 11 illustrates process steps with respect to 3D printing in accordance with the present invention;

FIG. 12 illustrates steps with respect to connectivity of a desktop app. for 3D printing in accordance with the present invention;

FIG. 13 illustrates steps with respect to 3D printing from a desktop app. in accordance with the present invention;

FIG. 19 illustrates a second sign-in GUI screen that may be used for a 3D print designer to sign in to upload his/her designs that are to be offered for sale to registered users;

DETAILED DESCRIPTION OF THE INVENTION

As used throughout this specification, the word "may" is used in a permissive sense (i.e., meaning having the potential to), rather than the mandatory sense (i.e., meaning must). Similarly, the words "include", "including", and "includes" mean including but not limited to.

The phrases "at least one", "one or more", and "and/or" are open-ended expressions that are both conjunctive and disjunctive in operation. For example, each of the expressions "at least one of A, B and C", "one or more of A, B, and C", and "A, B, and/or C" mean all of the following possible combinations: A alone; or B alone; or C alone; or A and B together; or A and C together; or B and C together; or A, B and C together.

Also, all references (e.g., patents, published patent applications, and non-patent literature) that are cited within this documents are incorporated herein in their entirety by reference.

Furthermore, the described features, advantages, and characteristics of any particular embodiment disclosed herein, may be combined in any suitable manner with any of the other embodiments disclosed herein.

The current 3D print market operates on a closed network, which lends itself to certain solutions. Where the 3D print market would operate on an open network, other solutions may be utilized.

The present invention provides for the protection of source code for a 3D design, and interacts with the operating system that controls a 3D printer (see e.g., U.S. Pat. No. 5,143,817 to Lawton; U.S. Pat. No. 5,171,490 to Fudim; U.S. Pat. No. 5,192,559 to Hull; and U.S. Pat. No. 10,232, 603 to Hartman), and/or controls a computer to which the 3D printer is connected. The system may provide several different forms of protection for the source code, and may include a particularly configured 3D printer.

Figure 2:
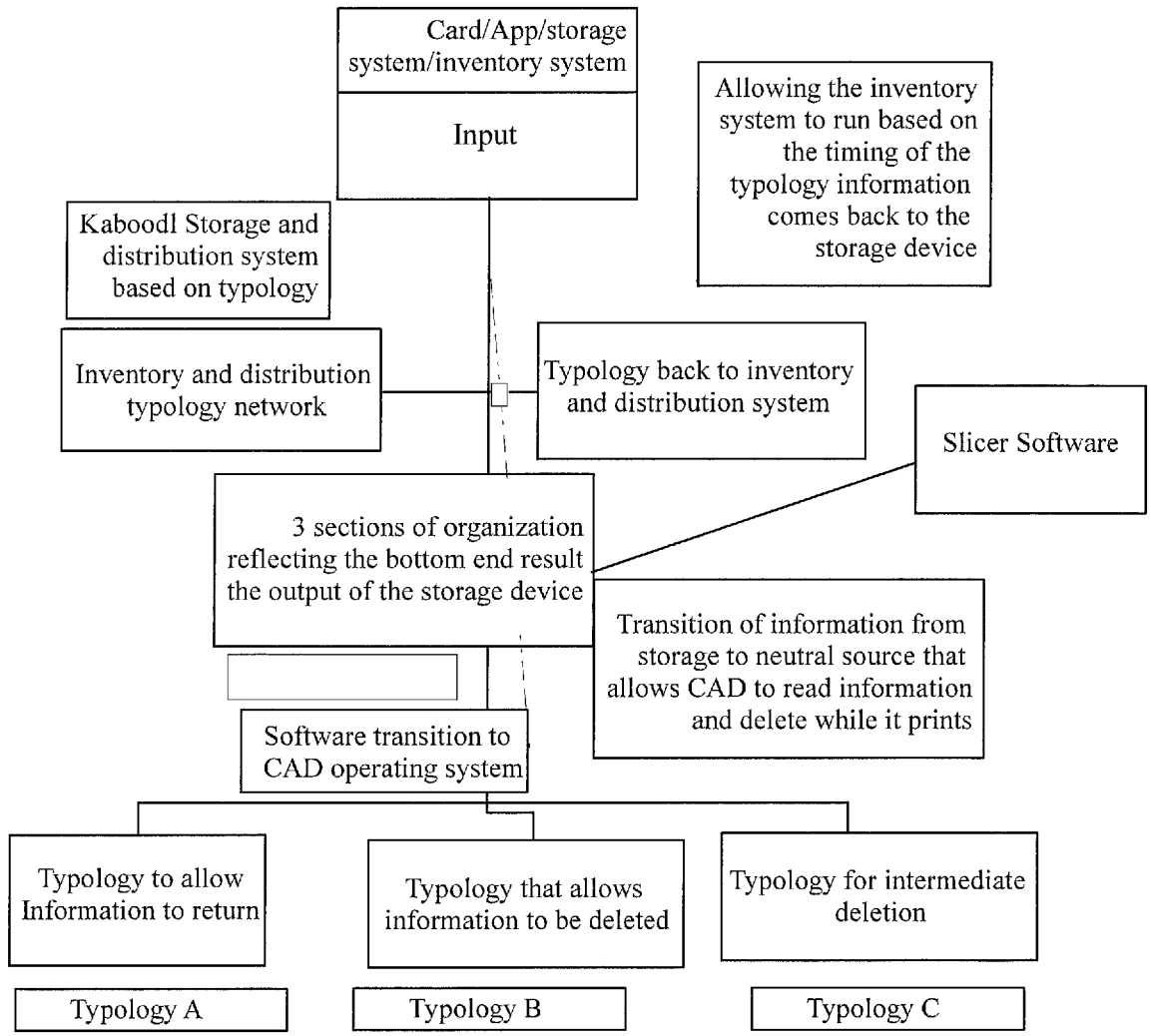
FIG. 2 discloses a flow chart illustrating three typologies for a method of controlling a 3D Printer and Inventory Control and Distribution System.

In a first form of protection, the source code may be stored as code that immediately deletes after the object is printed, or which code deletes portions of the code as corresponding portions of the object are printed (i.e., "Typology B" in FIG. 2).

In a second form of protection, the source code is stored in the computer and remains on the device, but is protected from being redistributed (i.e., "Typology A" in FIG. 2).

In a third form the source code may be stored as code that utilizes a counter, so that the code automatically deletes after a specified time period has elapsed, or which automatically deletes after a pre-determined number of usages for printing of the object on the 3D printer has occurred (i.e., "Typology C" in FIG. 2). These three forms of protection permit 3D designs to be marketed and sold, particularly online, while serving to protect the intellectual property interest of the designer in his/her designs.

In another embodiment, Blockchain may also be utilized to protect the copyrights and the integrity of design files after it is transferred over the internet.

Another problem solved by the present invention is the provision of a system that may universally accommodate all of the different types of 3D printers, and different 3D print objects, which require a different set up. There currently are seven different types of 3D printers:

Stereolithography (SLA)
Digital Light Processing (DLP)
Fused deposition modeling (FDM)
Selective Laser Sintering (SLS)
Selective laser melting (SLM)
Electronic Beam Melting (EBM)
Laminated object manufacturing (LOM)

All 3D printers are used by consumers by downloading digital files to an SD card and plugging the SD card into a printer, or by digitally downloading the digital file and sending it to the printer. However, the digital file must be adjusted at/for the printer physically by the consumer. The STL file is processed by a piece of software called a "slicer," which converts the model of the object into a series of thin layers and produces a G-code file containing instructions to print the slices, which instructions are tailored to a specific type of 3D printer (e.g., an FDM printer). This G-code file can be printed using 3D printing client software (which loads the G-code, and uses it to instruct the 3D printer during the 3D printing process). The 3D printers have no communication in or out because the industry is closed source and organizations have different designs for different printers. Even with current pay-to-print methods for existing products, the file is still download and must be handled by the consumer and it is therefore not protected.

Use of the methods described herein provide a full automated process with respect to printing of a purchased design file without compromising the IP of the design, by protecting the STL data file, throughout the entire business process.

The three methods disclosed herein are not used/available at the present time because all printers are closed systems that don't protect the design through the whole business process. There is no existing universal plug for designers and various brands to make one design be printable for all the different types of printers. The present invention provides that universal plug, and will create a new marketplace by allowing one design to be printed by all the different types of printers with a click of a button. The herein disclosed physical method protects designs on a card device, etc., and uses the same protection methods allowing customers with designs for a physical object to freely market them while being protected, whereas they heretofore were unable to prevent them from unauthorized redistribution. The present inventions provides physical and/or electronic methods that allows for printing at different locations, while still protecting the designs/code. This enables customers to print at kiosks if they don't want to purchase home printers, while enabling the code to be printed.

Figure 1:
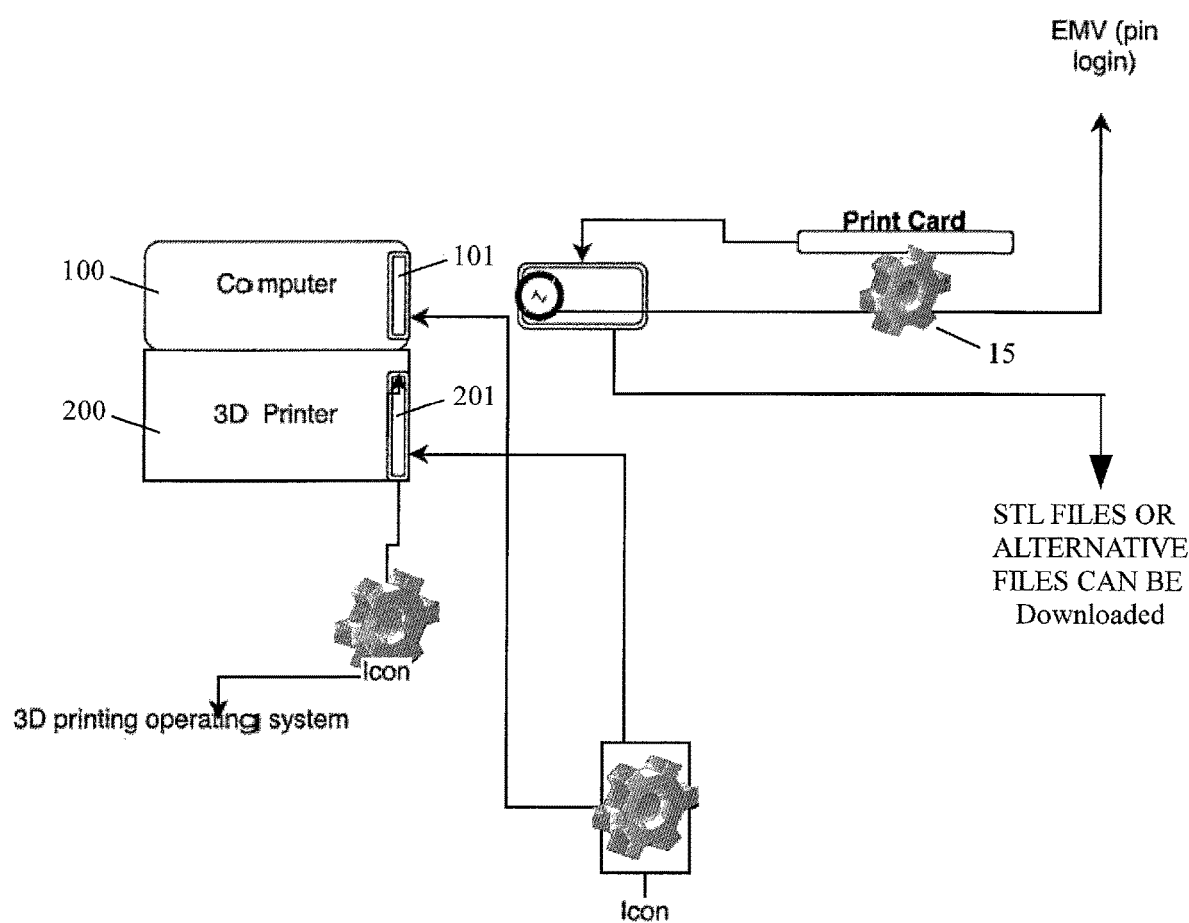
FIG. 1 discloses a flow chart illustrating various aspect of the 3D Printer and Computer System disclosed herein.

The first solution is a universal solution that uses a communication tool that plugs into a printer and delivers the correct code for a design to the printer being used, creating an automated process where the consumer can print with just a press of a button, and not have to adjust the printer(s) and/or the code. FIG. 1 illustrates a new computer system 100, and a new 3D Printer 200, each of which may be configured to be controlled by a print card 15, referred to as a raspberry pie. The computer 100 may include a slot 101, which may be configured to receive the print card 15 therein. The print card 15 may act as an inventory and distribution system for STL files or other such files containing printable 3D data. The print card 15 may also manipulate the operating system of the computer 100 to perform printing according to the three typologies defined above, which may be encoded into the print card according to the characteristics paid for at the time of purchase (i.e., permission to print 2 copies of the object before the code is deleted). Use of the print card may require a personal identification number (PIN) that may be assigned at the time the card is purchased, or at some later time.

In one embodiment of the print card, an analogy may be drawn between the print card of the present invention, and a bank debit card, where along with use of a personal identification number (PIN), the user is allowed to shop via an app/gateway within an online cloud store, and make secure purchases of the source code for a desired 3D object, the printing of which is controlled according to the above-noted methods. The DRM associated with the purchased code is then stored on the card. The card permits access to the online cloud store.

The operating system of the computer 100, which may be manipulated by the print card 15, may allow the user to see the inventory of designs stored on the card, and may also allow the user to browse and download printable 3D designs using an application program ("App") that similarly protects the designs. The computer, under the control of the print-card-manipulated operating system, may send the digital file defining the 3D object to a 3D printer. The operating system of the 3D printer 200 may also correspondingly be manipulated by the print card 15 according to the purchased typology ("A" or "B" or "C" in FIG. 2), particularly if it has its own memory.

A unique 3D printer 200 may also be configured to print designs directly using the print card 15, as the printer 200 may similarly be configured with a slot 201 that may receive the card therein. The print card 15 may have structure similar to, and may also be configured to operate in a manner similar to, a USB flash drive, as shown for example by U.S. Pat. No. 6,763,410 to Yu; U.S. Pat. No. 6,733,329 to Yank; and U.S. Pat. No. 7,287,705 to Tang. The corresponding slots 101 and 201 may thus be configured to read the data from the card 15 being so structured, to operate as described herein.

Figure 3:
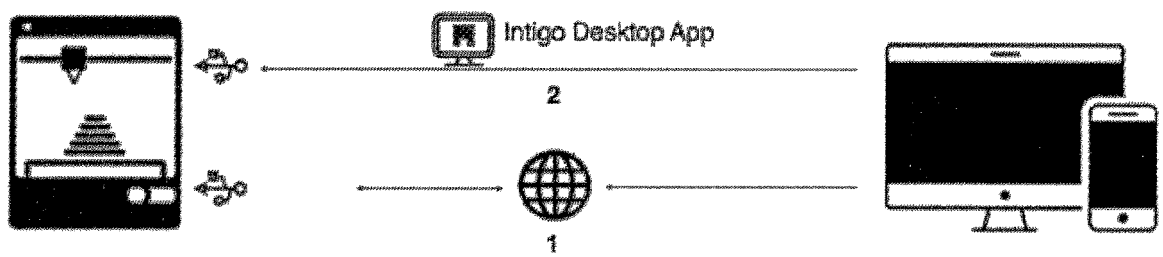
FIG. 3 illustrates how 3D printing works based on a single board computer.

FIG. 3 illustrates how 3D printing works based on a single board computer (SBC) device, which may have an embedded Wi-Fi module for internet connectivity, and which may connect with a 3D printer through a USB interface. The SBC device should have 2-way communication with the 3D printer device to be able to send print commands thereto. In one embodiment, customers can browse through different 3D models available for 3D printing from a library of such models. All 3D models may be uploaded by designers into the library through an independent designer web portal. Users of the system of the present invention can purchase a model and print it by sending an instruction to their purchased SBC device from the user website over the internet. In one embodiment the unique SBC device may connect with any supported 3D printer through a USB cable/port. The current methodologies in practice for 3D printing don't allow direct prints to be made on the 3D printer. The SBC device connected with the 3D printer may also be connected with the internet, which will enable the printer to act as an IOT device. Users can then directly print the files from an associated web portal, and the SBC device may not be directly connected with the user's computer. This also takes out the device/platform dependence for the selection of 3D prints, it can be accessed from any web enabled device including computers, laptops, tablets and mobile phones. In current practice, users download the 3D print files and then manually have to print the 3D object, this takes out the hassle and users with a beginner's skill level can easily print the files. And it also helps secure the 3D printable files, as the files are never accessible to the user and never transferred to the printer's memory, this helps achieve the Pay Per Print business model of the present invention.

Figure 4:
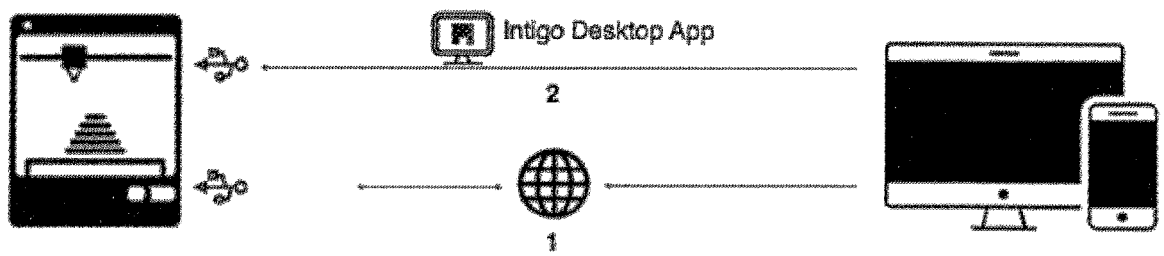
FIG. 4 illustrates how 3D printing works using a desktop app.

FIG. 4 further illustrates how 3D printing works using a desktop app. associated with the present invention. An independent desktop application may be made available for different platforms, including OS X, and Microsoft Windows. The app. can have a complete graphic user interface (GUI) for the 3D printing customers. A light version of the App may be configured to always be running on the device and may be accessed from a toolbar/status bar. Customers can browse through different 3D models available for print on the website or through the full version of the App. User can purchase a model and print it by sending an instruction to their connected 3D printer from the desktop or through the user website. A desktop application may be used for slicing and then transferring printable files to the printer, however the desktop application of the present invention also allows user to browse through a list of available 3D printable models and then print any of the models. The 'light version' of the app helps achieve the "print from anywhere" model of the present invention, if users have this app installed and has it registered under the registered account they can send prints to the printer connected with this application. Users can directly print the files from the web portal, by selecting this application under the list of connected printers. In current practices, users download the files and then manually have to print the 3D object, this takes out the hassle and users can print the files with a beginner's skill level. It also helps secure the 3D printable files, as the files are never accessible to the user and never transferred to the printer's memory, this also helps to achieve the Pay Per Print business model.

FIG. 5 illustrates a first series of registration steps for a single board computer in accordance with the present invention. When the SBC device is manufactured and prepared for market, it should first complete a device registration process as follows. The SBC device may call an internal server and request and receive a unique hardware ID for the device, which ID may be a long alphanumeric string. This is designed to prevent brute force attacks and Denial of Service (DoS) attacks on the Central (Intigo) server. Once a unique Id is received by the device, the device should call the central Intigo server along with a secret key known only by the device, to register itself as an available device. The secret key may be securely embedded in the software; it may be encrypted, and may be a very long sequence of alphanumeric characters, much like an SSL public/private key, an example of which follows:

MIIFDjBABgkqhkiG9w0BBQ0wMzAbBgkqhkiG9w0BBQwwDgQIS2qgprFqPxECAggA
MBQGCCqGSIb3DQMHBAgD1kGN4ZslJgSCBMi1xk9jhlPxP3FyaMIUq8QmckXCs3Sa
9g73NQbtqZwI+9X5OhpSg/2ALxlCCjbqvzgSu8gfFZ4yo+Xd8VucZDmDSpzZGDod The central server returns private key certs, a client ID and a unique public identifier. Each device can only be registered once, to prevent bloating on AWS devices gateway. The internal server is designed for internal access only; this is primarily to be used in SBC device provisioning once the device is prepared for market. The device may connect with the internal server using the internet over a secure HTTPs connection which is accessible only from allowed IP addresses, and the internal server assigns a unique hardware id for the device (which can also be accessed by the Central server). Once the hardware id is assigned to the device, the SBC device can now be registered as a thing through the central server. The purpose of having an internal server for hardware ID is to prevent brute force attacks on the system, as a device can be registered using any SBC ID as reference and there is no way to validate the IDs sent to the server. The internal server generates a unique system known hardware ID for the devices. The internal server may be placed inside the vicinity where the SBC devices will be manufactured/prepared for market, or it can be cloud based with access limited to certain IP locations known to the system. The reason for using an "internal server" and the "central server" is so that the internal server is only used to generate hardware IDs for the SBC devices or license numbers for the desktop applications. The purpose of internal server is to control the access to the server that prevents fake device registrations. The central server is accessible publically and serves all the content for web portals and manages the print system. For devices the central server only accepts incoming web calls having a registered hardware id. The two servers will preferably be separated and all the portals will only have access to the central server, which is primarily for security; the internal server if made public can be used for brute force to bloat the database and to have denial of service attacks on the complete system. With respect to the use of both a "private key" and a "public identifier," the devices connect with an AWS device Gateway through the MQTT protocol over TLS V1.2 to establish a connection. The device uses CA Certs, which are installed on the device to validate the authenticity of devices gateway, and then uses both Private key and Public Pem files to verify its identity for the connection.

FIG. 6 illustrates a second series of registration steps for a single computer in accordance with the present invention. The central server may expose a public API for devices which can be accessed over a secure channel. The API takes the secret key, and hardware id to validate the request and process the registration on an Amazon Web Services (AWS) IOT devices gateway. The API returns the private key certs, client ID and unique public identifier which will be stored permanently on the device. The central server may call AWS IOT services using a restful API and register the device as a thing on things gateway. The central server may register all the devices on AWS IOT and also generates a human readable client id, which becomes the identity of the device. When the user wants to connect that specific device with their registered account, they will use this client ID. Note—the AWS IOT is a service that enables us to send and receive notifications to the devices. The devices are registered on AWS, however client IDs are saved on the central server. And also controls the information regarding which device is being connected to what user account.

FIG. 7 illustrates a series of registration steps for a desktop app. in accordance with the present invention. Users can download the desktop App through respective App stores e.g. App Store for OS X and Windows Store for Windows based systems. Each desktop App may have a unique license key and may be activated when the user logs in to the App. The App connects with the central (Intigo) licensing server to check the authentication and validity of desktop App. The desktop App once connected with the user account will have synced data and the user can select the App from the list of printer devices on the user web portal.

FIG. 8 illustrates and defines steps in an embodiment of the 3D printing process in accordance with the present invention. All the 3D models are upload by designers through a dedicated designer web portal. Designers can register on the portal through an invite or by accessing the portal and signing up using an email address. Users can browse through available 3D models through a Website from their personal computers, laptops or mobile device or through a platform specific Mobile App, e.g. iOS App, Android App, Windows 10 App. Users can view details of each 3D model; the details may include 3D view(s) of the model, an image gallery of the model from different angles. User can also select the models for Print from the model detail screen. To print a model users must be logged into the user. The print feature will only be available for registered users. When the user clicks Print, the system will check for an available device. If the user has no registered device or any connected desktop App, the user will be prompted to add a device with instruction on how to get a device or the desktop application. If there are devices connected with the user's account, the user is prompted with a drop down list to select the device or the connected desktop App. After selecting the device or desktop App, the user will have to enter Payment details or an option to use a previously saved payment method. Once payment is successful, print notification is sent to the selected device or desktop App. The user will have to pay for each print; each new print will only initiate once payment is successful. If the user selects a previously printed model they will have to pay for the print again. The print price may be controlled through an Admin portal, it can be same price for all the models or each model can have an independent price for print.

FIG. 9 illustrates further steps in a registration process in accordance with the present invention. Once a device is purchased by the user, the user should connect the device with their registered Intigo account. (Note—the device registration process is for provisioning new devices on the system independent of the user, once the device is registered and a client ID is allocated, it can then be connected with a registered Intigo user account, and the user can register for an account through web portal/application, signing up using email address, and can have an account without any device being connected). The user can use the unique public identifier and enter the client ID printed on the device into a web portal to connect the device, and this process can also be achieved by printing a QR code on the device with an embedded identifier so the users won't have to manually add the code. Once the device is connected with a user, it can't be connected with any other user and the device is marked as an active device until the user deliberately transfers the device to another account.

Figure 10:
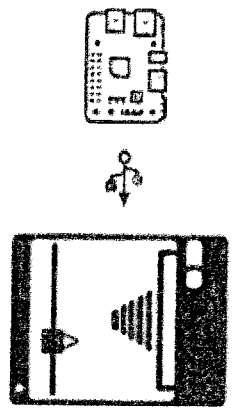
FIG. 10 illustrates steps with respect to connectivity of a registered device for 3D printing in accordance with the present invention.
Figure 14A:
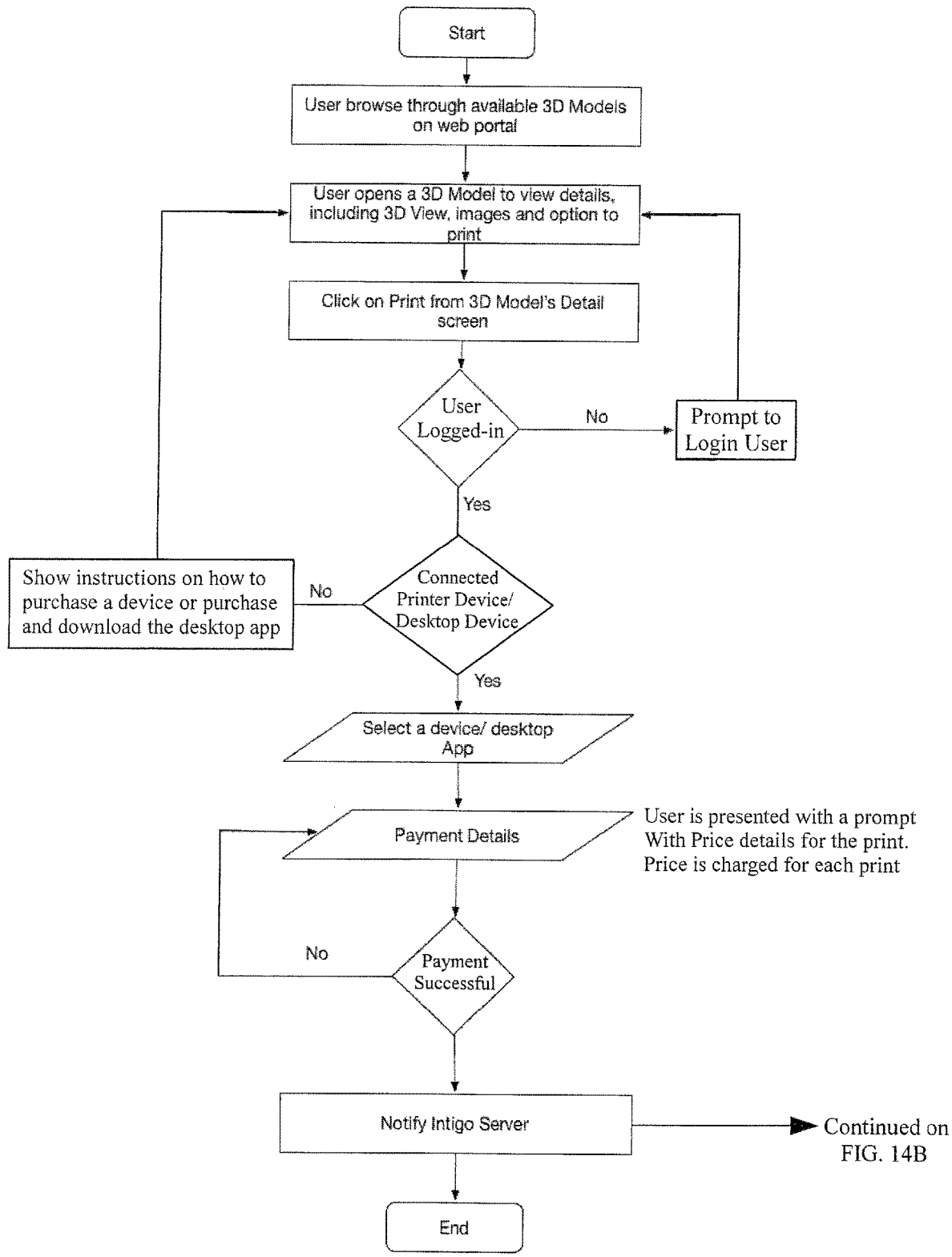
FIG. 14A is a first flow chart of a portion of the 3d printing process of the present invention.
Figure 14B:
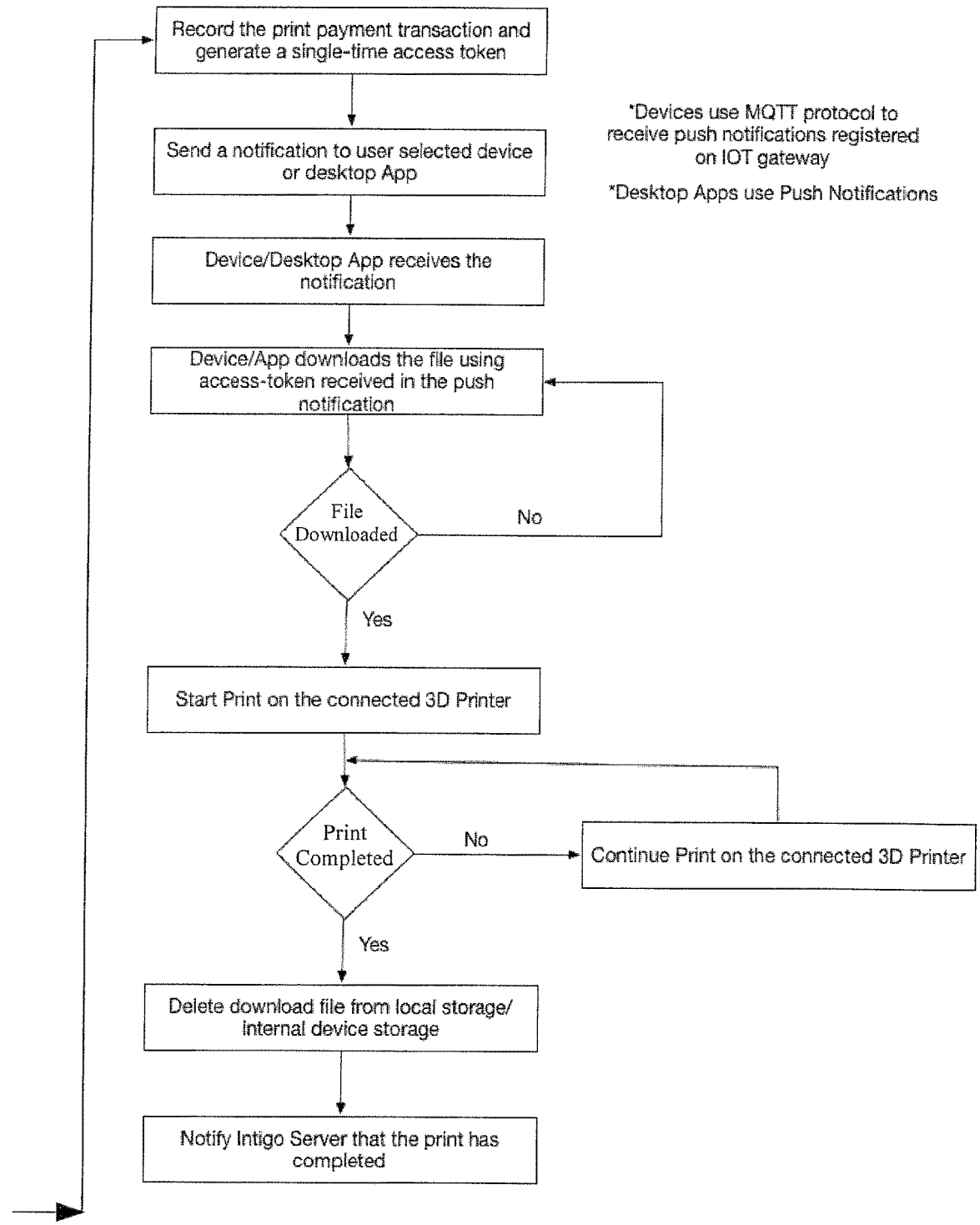
FIG. 14B is a second flow chart of a portion of the 3d printing process of the present invention.
Figure 15:
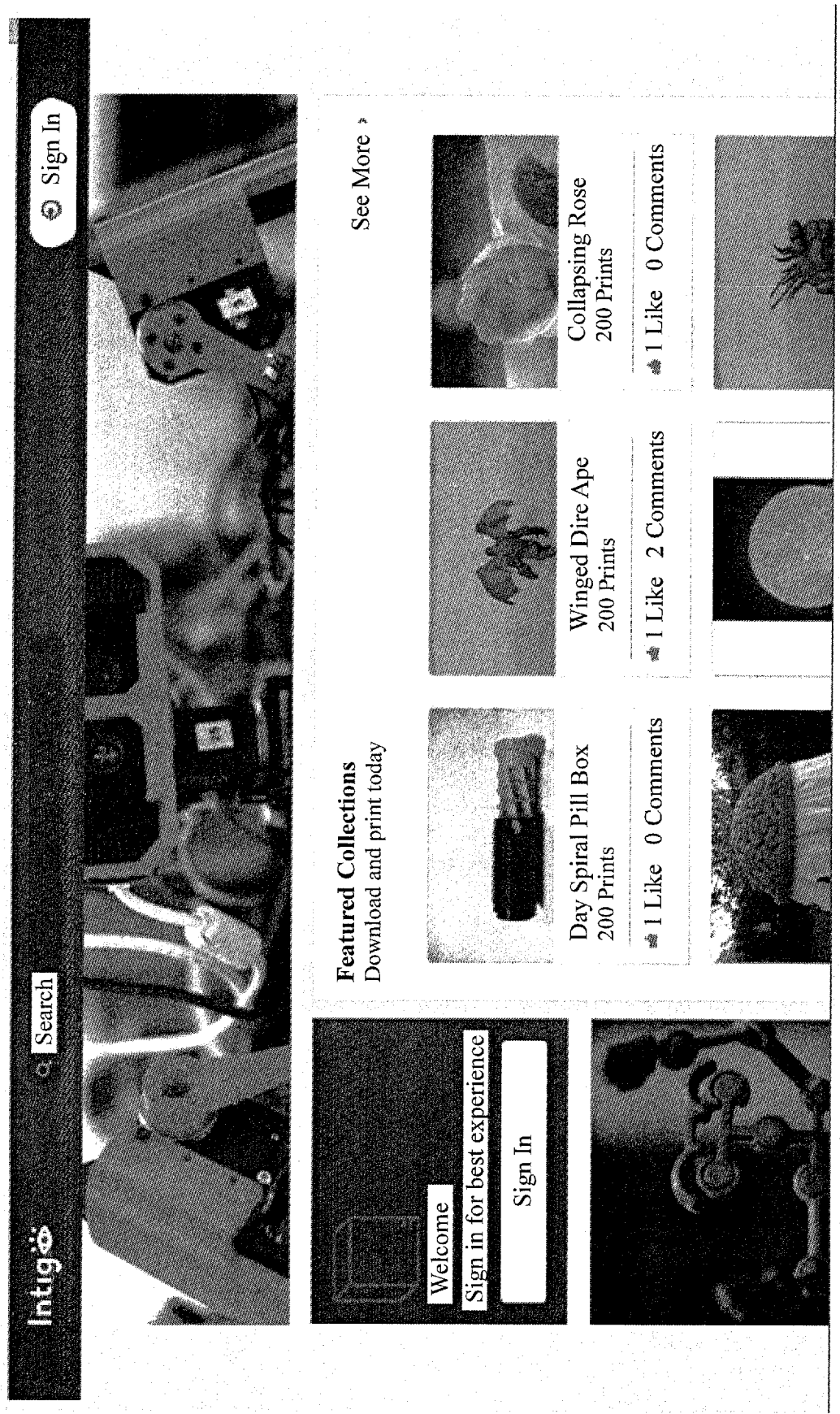
FIG. 15 illustrates a graphical user interface (GUI) screen in accordance with the present invention, being usable to initiate signing in by a user.
Figure 16:
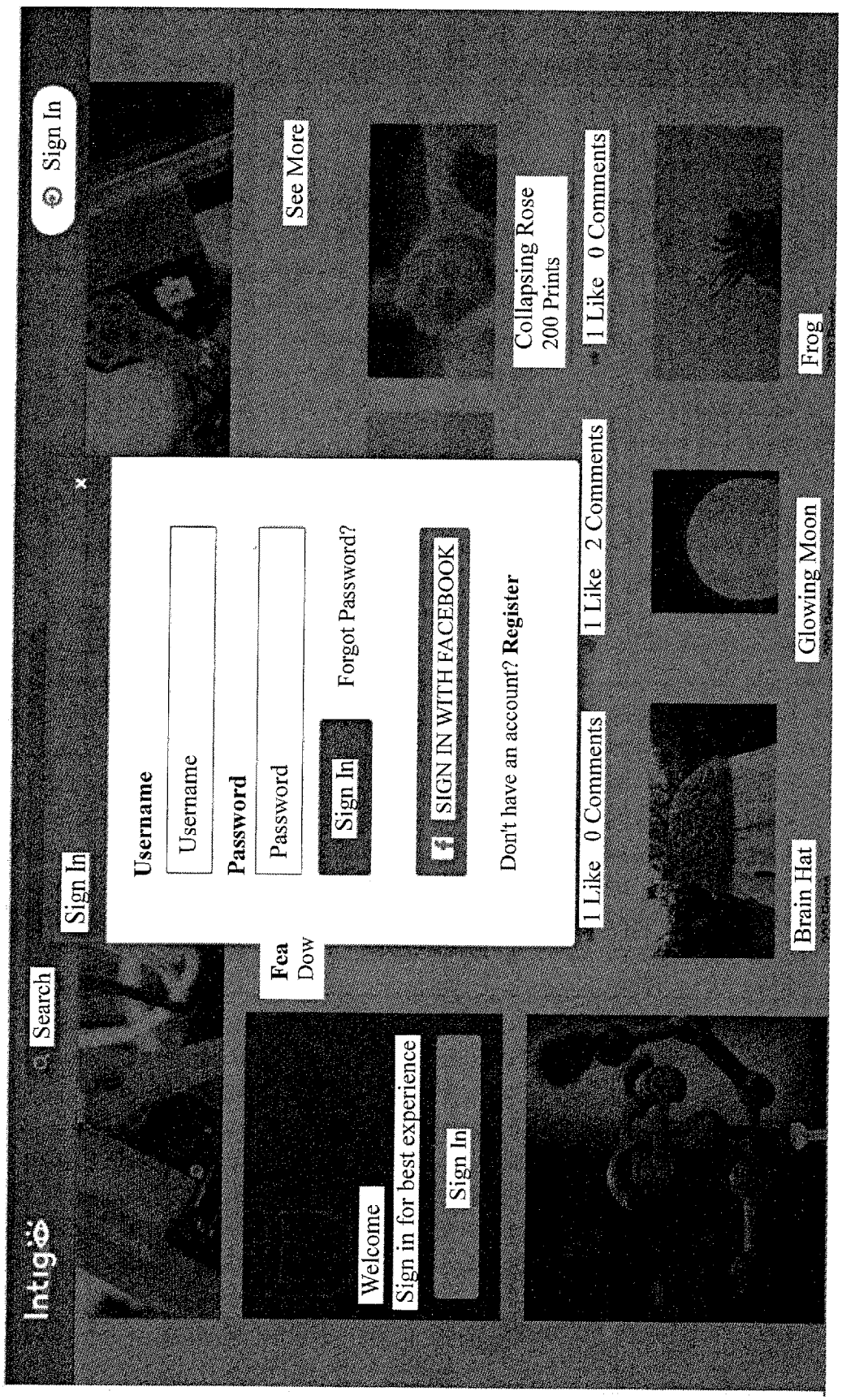
FIG. 16 illustrates a graphical user interface screen usable for signing in of the user into the system.

FIG. 10 illustrates steps with respect to connectivity of a registered device for 3D printing in accordance with the present invention. The Single Board Computer (SBC) device may implement an IOT device sdk in the device or use Python libraries to constantly listen for new notifications over internet using the MQTT protocol. The MQTT is a low bandwidth, lightweight protocol that works on top of the TCP/IP protocol. Once the device is marked as active on the server, i.e., it is connected with a user, it can be used to print 3D models. Every time user purchases a print and sends the instructions to print, this connected device will get a notification over MQTT. The notification will only tell the device that a new print is available for the user and send a single-time access token along with printable model ID for the user. The central server will maintain all the configuration settings configured by the user for printing, including print quality, in-fill density and temperature settings; these will be used by the device to generate 3D printer readable gCode. In this embodiment the token may be a digital entity, which may be an encoded string, that may be used by the central server to identify and verify access to the system. An example of the access token follows:

```
EAAXK30wgRWcBAGVtmRGkvFGxQG1NPnLZBmi9VYeZCZAKRUHkLEYfdXBiSLTNR
W4Ic84mqiyrp31XOg1WzbZBNhaDv21hz6vNkzZBhmyBx7PBXU9VBJoB5jKFRdineA7iSmel
iAFtD4HI0veZBX4VVi3CRQHF4nZBwjtdnz9E1iQa1KLy8sVXsWp6CU50X6aTm6GIrRRFS
UuwVZA85LZAbQBwHjSrpE0ReAYpBMCKoYCm3pQZDZD
```

In one embodiment, the access token may be usable for a limited time, or for a single time, or for different types of access to the system.

FIG. 11 illustrates other aspects with respect to 3D printing in accordance with the present invention. Once print notification is received on the device along with a single-time access token, the device may communicate with the central server using the HTTP protocol using a secure public API. The central server returns the printable file to the device over a secure channel and also sends all the user selected configurations for gCode generation. Once the device successfully downloads the file and converts the code it notifies the system using the MQTT protocol, and a notification is sent to user that the file is ready to be printed. After successfully printing of the model, the device notifies the system over the secure channel and deletes the files from it's internal storage. For each new print the user will have to follow the process again and purchase the rights to print the file again.

FIG. 12 describes other aspects with respect to connectivity of a desktop app. for 3D printing in accordance with the present invention. The Desktop App may contain a full version and a light version running as a service and can be accessed through a toolbar/status bar, and may start on each boot up of the desktop. This may always be running in the background even if the full version of the App is not running on user's desktop. The App may implement a Push notification system to get notifications from the Intigo Server. Once a desktop App is marked Active on the server, i.e. it is connected with a user, it can be used to print 3D models. Every time a user purchases a 3D print and sends the instructions to print by selecting the desktop App from the drop down list, the desktop App will get a notification. The desktop App may also check for any pending notifications on startup to check for missed notifications. The notification will only tell the App that a new print is available for the user and may send a single-time access token along with a printable model ID for the user. The central server may maintain all the configuration settings configured by the user for print including print quality, in-fill density and temperature settings; these may be used by the device to generate 3D printer readable gCode.

FIG. 13 describes other aspects with respect to 3D printing from a desktop app. in accordance with the present invention. Once print notification is received on the App along with a single-time access token, the device communicates with the central server over the HTTPS protocol using a secure public API. The central server may return the printable file to the device over a secure channel and also sends all the user selected configurations for gCode generation and if gCode file is available it will send a link to the downloadable gCode file. The App may then check for connected printers over USB. The App will then start printing the file and will show the status of the print. After successful printing of the model, the App notifies the system over the secure channel and deletes the files from it's cache. For each additional 3D print the user will have to follow the process again and purchase the rights to print the file again.

Figure 6A:
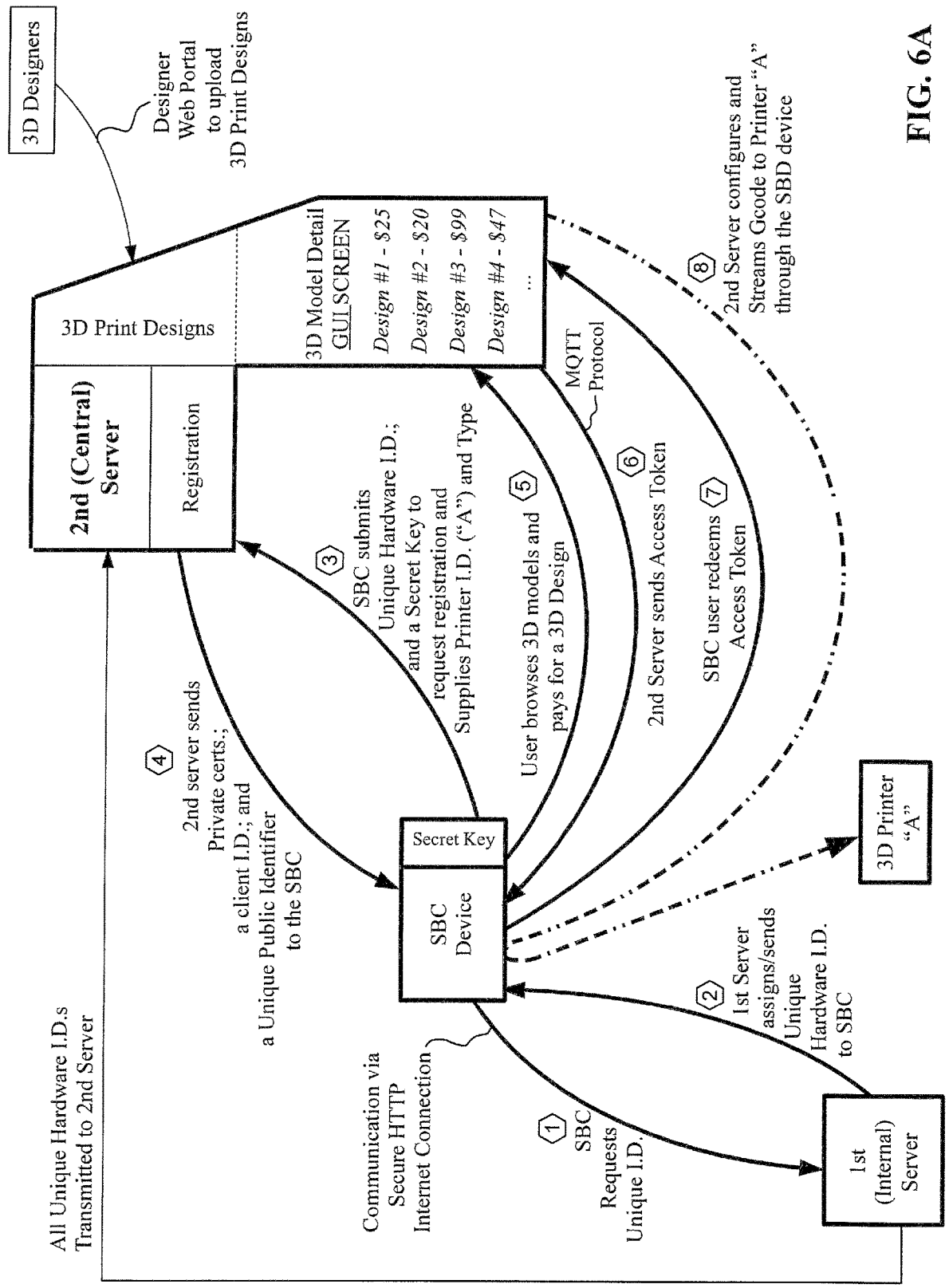
FIG. 6A is a flow chart of portions of the registration process for a single board computer.
Figure 17:
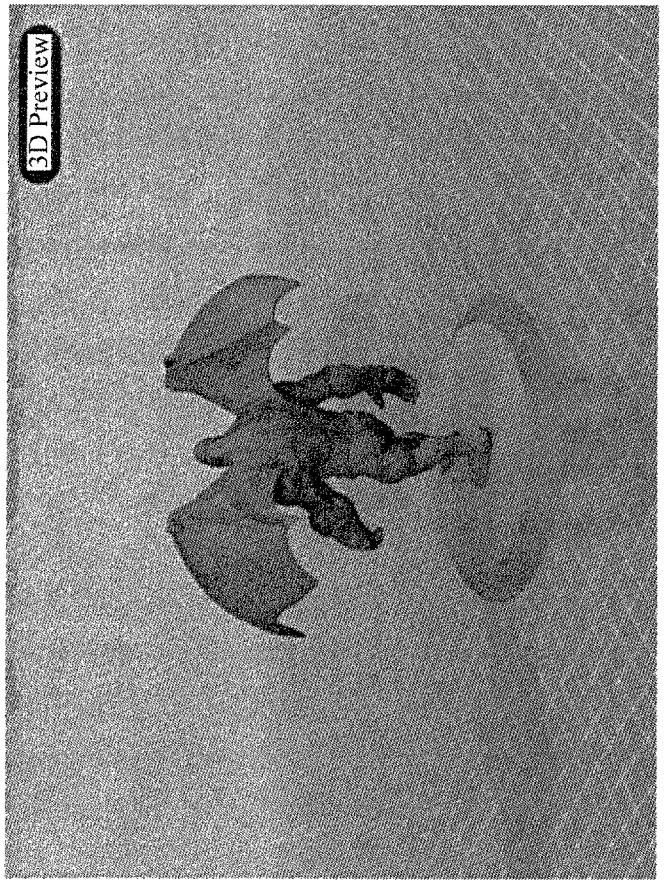
FIG. 17 illustrates a graphical user interface screen of the present invention displaying a 3D print design, which design is available to be printed by a signed-in user.
Figure 18:
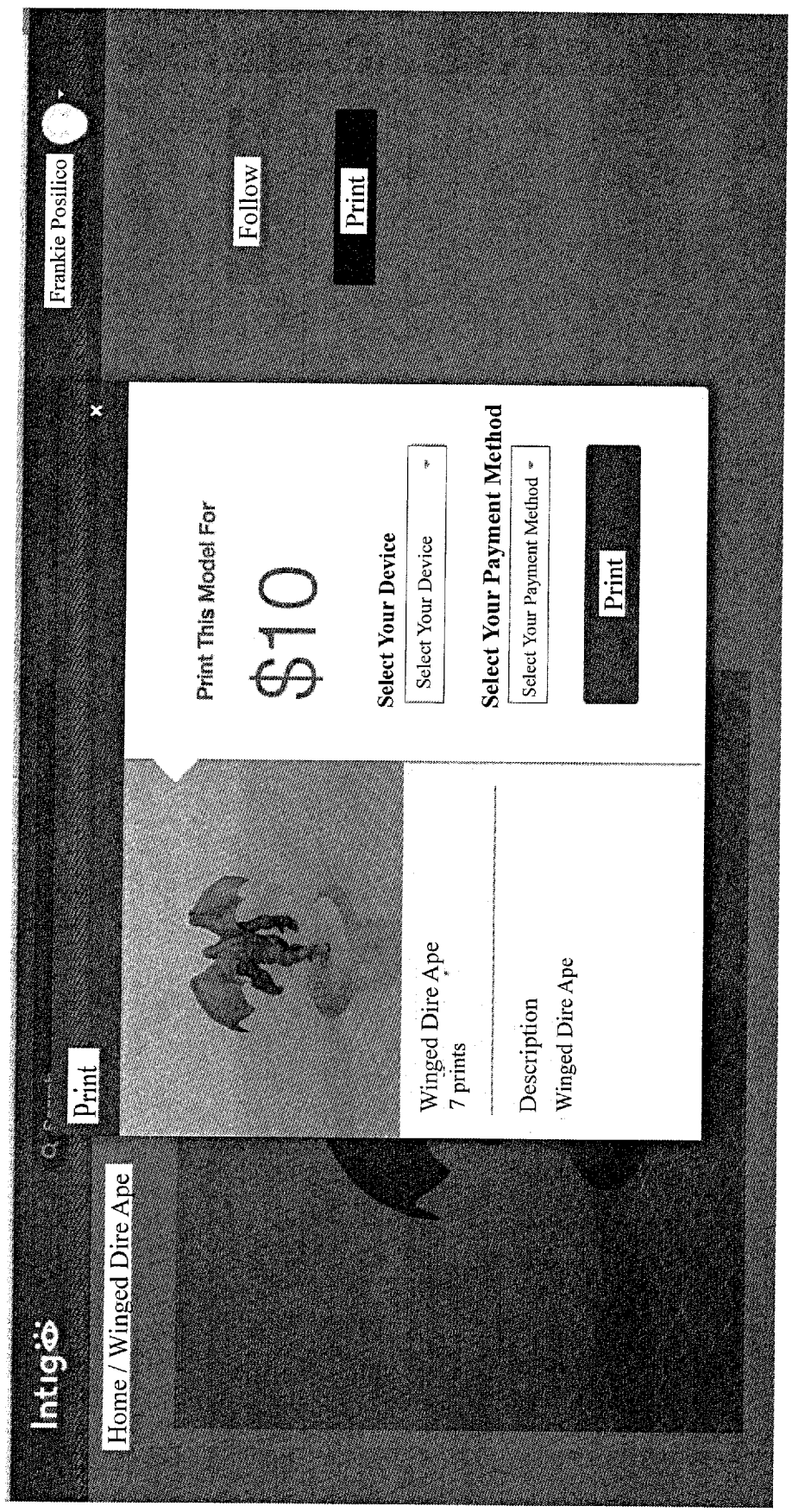
FIG. 18 illustrates a graphical user interface screen of the present invention displaying the 3D design of FIG. 17 after having been selected by a signed-in user to be printed upon payment of the fee, and after identifying which printer of the user is to be used, which 3D design will be protected against unauthorized redistribution in accordance with the present invention.
Figure 20:
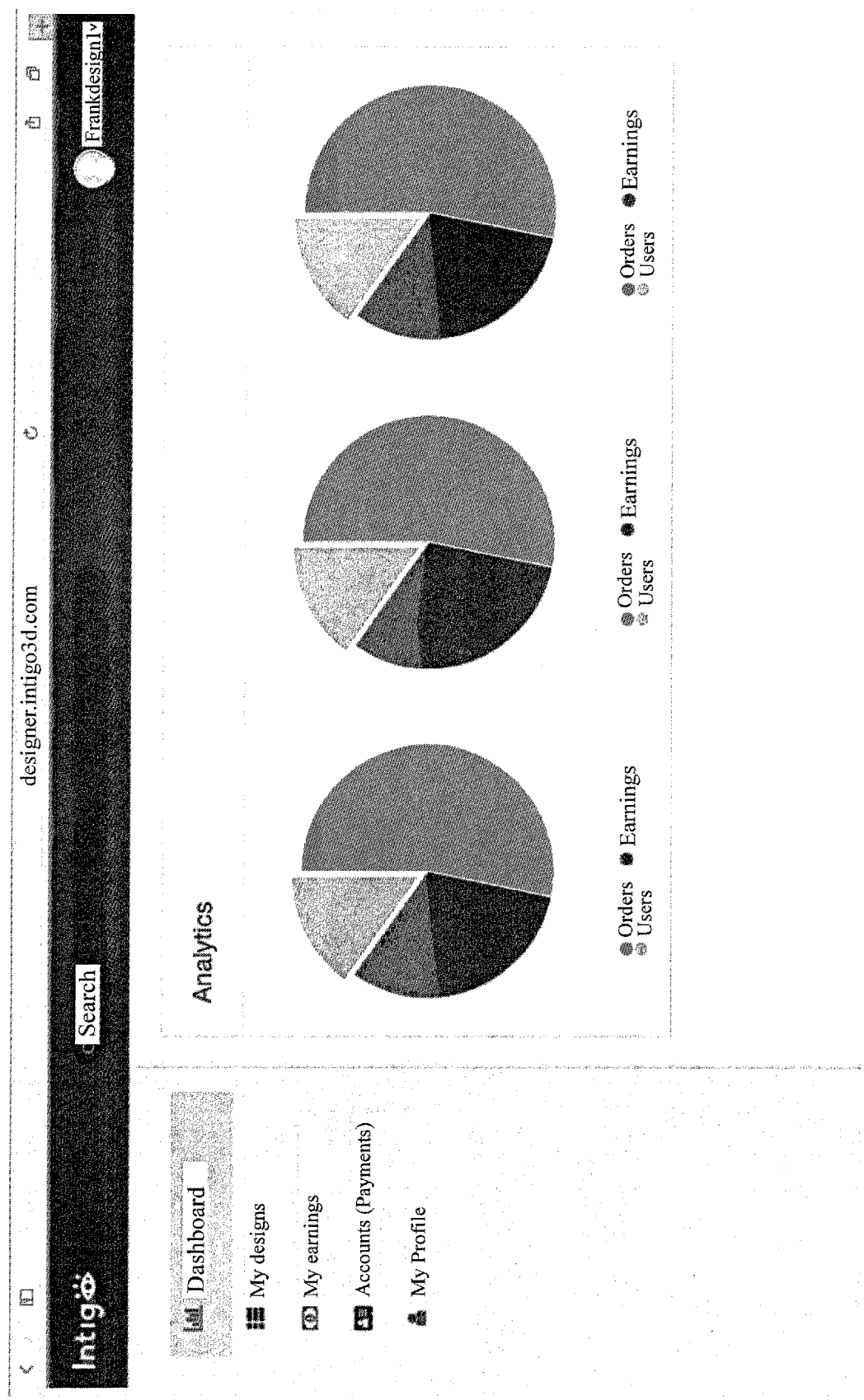
FIG. 20 is a GUI screen that may be used by 3D Print designers to monitor sales of their uploaded designs.

In one embodiment of the invention, as shown in FIG. 6A, a computer system may be configured for a method of controlling use of downloadable proprietary source code defining 3-D object data usable for printing the object on a 3D printer. The computer system may include a first (internal) server, a second (central) server, and a single board computer. The first server, the second server, and the single board computer (SBC) may each include: a central processing unit and a non-transitory computer-readable storage medium (CRSM) comprising instructions to program the first server, second server, and single board computer, respectively. The instructions on the CRSM of the SBC may be configured to request a unique hardware ID from the first server, and the instructions on the CRSM of the first server may be configured to assign and send a unique hardware ID to the SBC. The CRSM of the first server may also be configured to send the newly assigned unique hardware ID to the second server. The instructions on the CRSM of the SBC may be configured to submit the unique hardware ID and a secret key to the second server to request registration of a user and a printer with the second server, and the instructions on the CRSM of the second server may be configured to send private certs, a client ID, and a unique public identifier to the SBC in response. The instructions on the CRSM of the second server configure the second server to receive and store the code defining 3D print designs from registered designers through a web designer portal, and to on-demand display the 3D print designs in a GUI screen (e.g., FIG. 17). The instructions on the CRSM of the SBC may be configured for a registered user to purchase a quantity of 3D print designs in the GUI, and the instructions on the CRSM of the second server may be configured to send an access token to the SBC in response to the purchase. The instructions on the CRSM of the SBC may be configured for redeeming the access token for a selected 3D print displayed in the GUI, and the instructions on the CRSM of the second server may be configured to adjust gcode of the selected 3D design for the particular printer(s) that was identified by the user during the registration or at a later time, and to stream the adjusted gcode to that printer. Note that more than one 3D printer type may be registered and used, and the system will provide adjusted gcode for the selected for the print. In one embodiment the CRSM of the second server may be configured to stream the adjusted geode to the printer through the SBC, as shown in FIG. 6A, with Https streaming over a web connection to the SBC device either and internet connection provided to the SDC device, or Wi-Fi, or physical cable. The MQTT protocol may be used for messaging and notifications not data transfer. In another embodiment the CRSM of the second server may be configured to stream the adjusted geode directly to the printer.

Figure 6B:
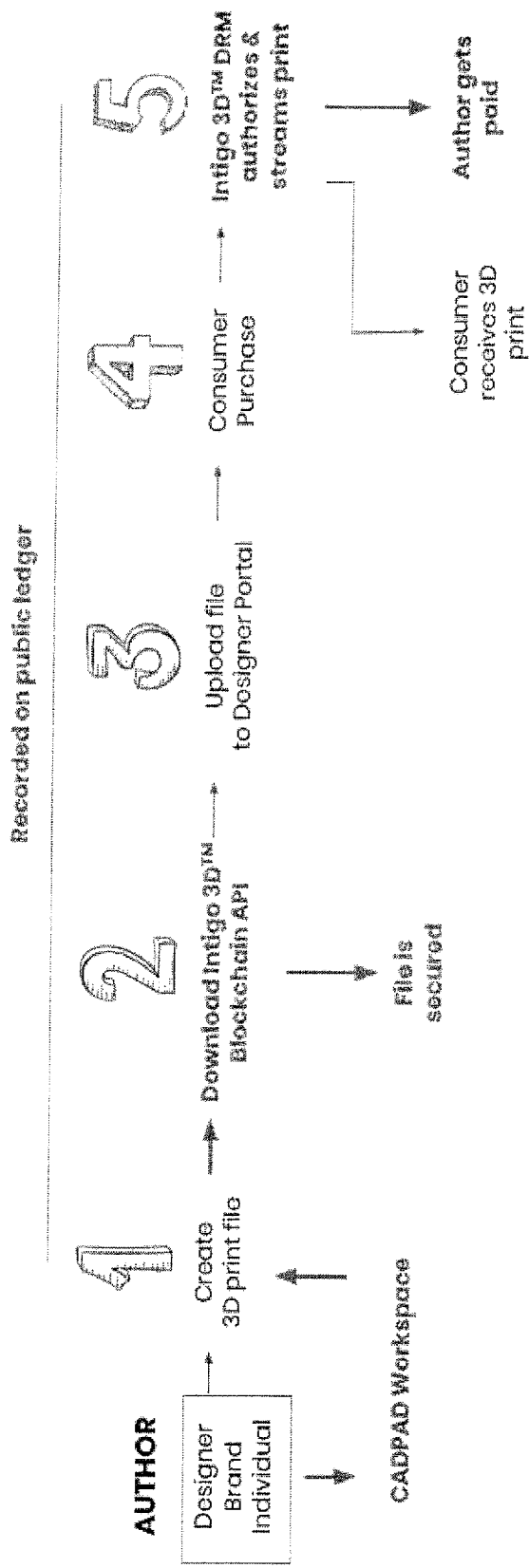
FIG. 6B is a flow chart showing the steps in the process for an author of a 3D print design from design creation to receiving a payment from the sale of the design using an online design portal.

In another embodiment, as shown generally in the flow chart of FIG. 6B, the author of a 3D design may create a print file for the design using the file format of their preference. The author may then download the API in which all transactions are tracked using a public ledger. The author may then upload the print file to the designer portal using the API, where it is available online for purchase by consumers. The uploaded file may have a hash embedded therein. When a consumer purchases the design, the API authorizes and streams the code for printing to the consumer, and tracks payment received from the consumer and payments made to the author of the purchased design. In the case where a consumer does not have access to his/her own printer, a print management network of the API locates the closest available public printer to compete the printing process.

Also, in one embodiment, the API may be configured to feature a token reward program where a user receives a fractional remuneration on their exposed big data of user information to advertisers. The rewards program may increase the number of registrants to the platform, provide more value to the advertisers.

As noted above, Blockchain may be used to protect the intellectual property and integrity of design files, and may involve a multi-step process as follows. First, the designer uploads his/her design through the API. Next the API adds a hash to the design file, publishes the hash to the Blockchain, and appends the hash to the file. (Note—Blockchain hashes enable security during message transmission when the message is intended for a particular recipient only, whereby a formula generates the hash to protect the security of the transmission against tampering—see, "What is Hashing? [Step-by-Step Guide—Under the Hood of Blockchain]", available at: blockgeeks.com/guides/what-is-hashing/). In one embodiment, the file with the hash may be stored on a central server from where it may be streamed to the purchaser. In another embodiment, the API instead sends the file with the hash to the author/seller who deposits it onto his/her database, and later on when the design is purchased by a consumer, the API sends a request to the author asking the author to stream the design file to the designated 3D printer (i.e., the purchaser). Alternatively, when the file with the hash is stored on the central server, the API sends the design file with the embedded hash to the purchaser/3D printer. In either case, the API verifies if both hashes match—the hash in the file sent by from the author database or from the central server, and the hash sent by the API to the printer. If the match is positive, then the design file after streaming over the internet to the 3D printer is not corrupted and is ready to print with the keyways provided by the API. The API creates a unique pair of codes for the design file each time it is purchased for printing, so that the design file sent to the 3D printer cannot be used again to print.

There are two embodiments for corroborating (i.e., for comparing) the embedded hash in the design file and the hash sent by the API. In one embodiment, similar to the embodiment discussed hereinabove, a particularly constructed 3D printer system may be configured to receive both the print file with the embedded hash (which may be in the first few lines of the code) and the hash sent by the API, and may be further configured to automatically compare the two hashes and to print the 3D design only when the hashes match.

The Blockchain of the API will keep track of these transactions and record them on a public ledger. Where multiple copies of the design have been purchased, the Blockchain will be updated as each copy is made. The Blockchain will automatically make the required payment or payments (e.g., payment to the author) after the order is fulfilled. This process provides designers with proof of ownership to dispute copycats when needed, and the integrity of the data files are checked for corruption of the data before the 3D printer starts to move.

The tokens used herein, named ITO tokens, may be issued on the Ethereum Blockchain, which is capable of storing transactions and running smart contracts. In one embodiment the ITO token(s) may be ERC-20 compliant, and in another embodiment the ITO token(s) may be ERC223 compliant. ERC-20 tokens are advantageous to the end users as they provide fast and streamlined transactions, quick confirmation of transactions, reduced risk of contract breaking, improved security, lower fees, and expert ability to handle incoming transactions in smart contracts. The ERC-20 token has six mandatory functions and three optional functions. The three optional functions include the ability to name the token, to assign the token a symbol, and the ability to determine how dividable the token is by specifying a number of decimal places. The mandatory functions include creating a method that defines the total supply ("totalSupply) of the tokens so that when the limit is reached, the smart contract will refuse to create new tokens; creating a balance of ("balanceOf") method, which has to return how many tokens a given address has; a first transfer function ("transfer") which takes a certain amount of tokens from the "totalSupply" and gives them to a user; a second transfer function ("transferFrom") which can be used to transfer tokens between any two users who have them; an "approve" method that verifies that the contract can give a certain amount of tokens to a user taking into account the total supply; the "allowance" method is similar, except that it checks to see if one user has enough balance to send a number of tokens to someone else.

The ERC-20 tokens are also customizable. The ITO tokens are ERC-20 tokens customized herein to also enable the following features:
  automated buying & selling; you can assign a token's value to that of another token or currency by creating a fund that you can automatically buy or sell in order to maintain the balance;
  auto refill option: transactions conducted on the Ethereum Blockchain require payments to minors in "gas," and the customization program the token to auto refill "gas" for future transactions once it goes down to a certain level;
  token freeze—so that if instructions from a regulatory authority request a freeze in the circulation, the tokens can be frozen, and subsequently unfrozen when authorized to do so;
  a centralized mint can be used to modify the number of tokens in circulation if needed.

The following is a discussion of a section of the smart contract integrated into the Blockchain of the API to perform payment once an order is confirmed, The following illustration is simplified to be easier to understand, so therefore some variables are made to be constants, the example omits the number of prints allowed, and the example does not differentiate different messages and instructions to the printer and designer. In the example it is assumed that the customer orders a product listed for $60. The exchange rate of the token for the API is 1:100, i.e., the token is worth $0.01. The list price consists of $59.95 charged by the 3D printer to print the product and delivery. The loyalty reward to the designer is $0.02, and the commission to the API is $0.03. Without optimization of codes, part of the smart contract in Solidarity looks as follows:

```
function printthisitem(uint256 itemcode) public {
    require(tokenContract.transferFrom(msg.sender, address(service_contract), 5995));
    require(tokenContract.transferFrom(msg.,sender, address(designer), 2));
    require(tokenContract.transferFrom(msg.sender, address(intigo_platform), 3));
    mapping (address => string) message;
    function sendMessage(address _servicecontract, string _message) {
        message[_servicecontract] = _message;
    }
    function sendMessage(address _designer, string _message) {
        message[_designer] = _message;
    }
    function readMessage( ) returns (string) {
        return message[msg.sender];
    }
}
```

The first "require" line carries out the pre-approved transfer of 5995 ITO tokens from the sender (i.e., the consumer) of the message to the service contract. The second "require" line does the same by requiring the transfer of two ITO tokens from the consumer to the designer as a royalty payment. The third "require" line is similar by requiring the transfer of three ITO tokens from the consumer to the API platform as a commission. If line 1, 2, or 3 fails for any reason then the function will terminate, ensuring that the contract is paid for the work it undertakes. Otherwise it sends a message to the service contract to print out the desired item as requested. A message and instructions is sent to the printer to print the order. A separate message is sent to the designer, notifying him that his design was used and a royalty paid to his API wallet. Notice that the transferfrom( ) function shows that it is called as part of the printthisitem( ) transaction, not requiring any manual intervention on behalf of the service contract to trigger it (this also means that it will not show up as a separate transaction on the Blockchain, but be part of the printthisitem( ) transaction), so all the payments are made automatically and deducted and credited to the appropriate parties, all handled by the smart contract neatly.

Figure 21:
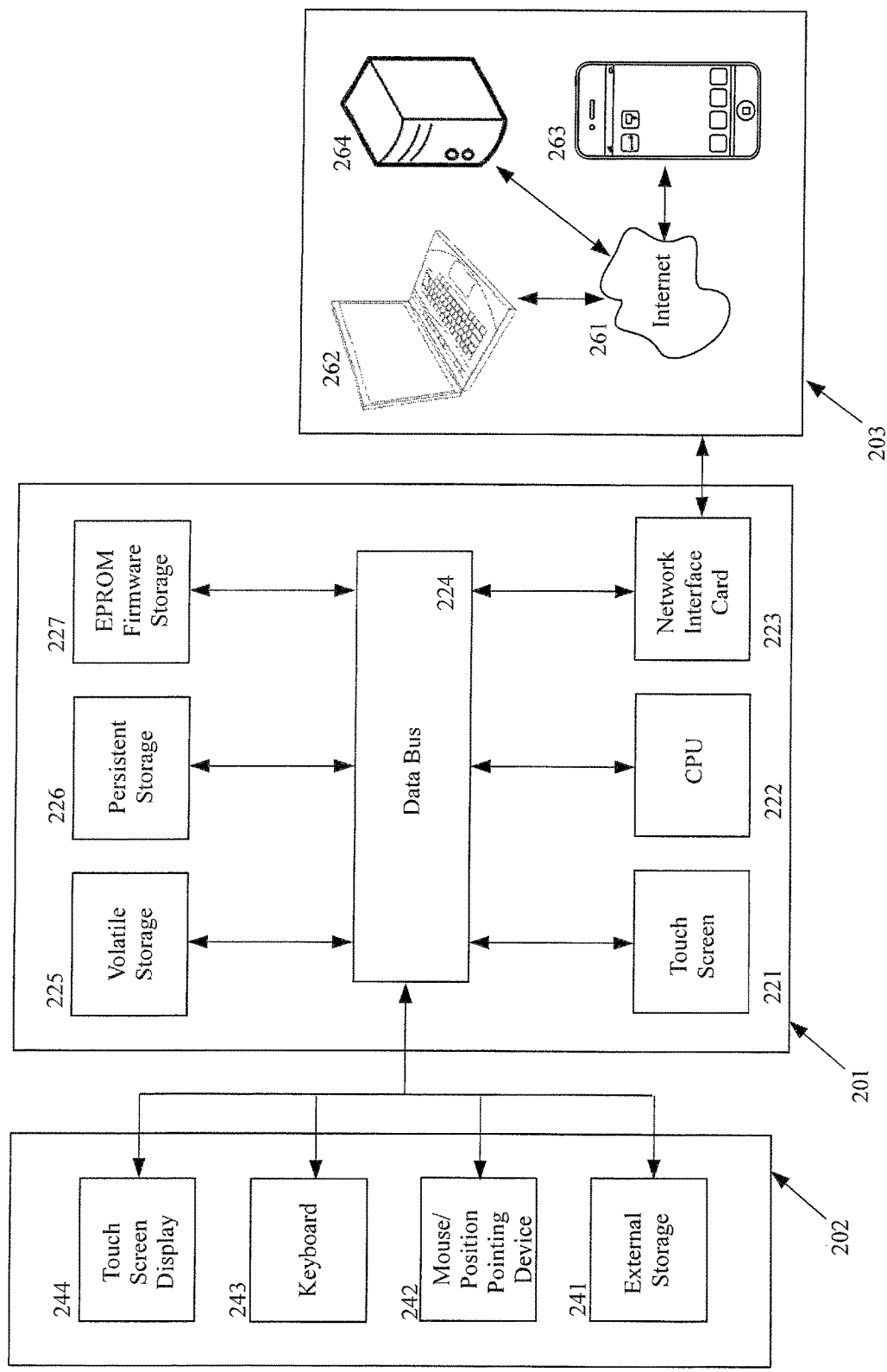
FIG. 21 is a schematic illustration showing an exemplary computing unit capable of being programmed by the software instructions in accordance with at least one embodiment of the present invention, and which may include personal computers, cellular phones, and other mobile devices.

The computer system disclosed herein, and corresponding software, may include components of any standard computing device, such as a server, a tablet, a cell phone, or other mobile smart device, so a description of such an accessorized exemplary computer system is hereinafter disclosed, even though a particular embodiment may not require all of the described components. Exemplary computer system 200 (i.e., a client device associated with a particular user) is shown schematically in FIG. 21, and which may comprise computing unit 201 interacting with external peripherals 202, such as a separate touch screen display 244, and interacting with network resources 203, including use of the internet 261, and other computers (or other client devices or a server), which may be a laptop computer 262 (i.e., a second client device associated with a second user), a smart phone 263 (i.e., a third client device associated with a third user), a server 264, etc.

The computing unit 201 may include a data bus 224 for communicating information across and among various parts of computing unit 201, and a central processing unit, which may be a microprocessor (hereinafter "processor" or "CPU") 222 coupled with a bus 224 for processing information and performing other computational and control tasks. Computing unit 201 may also include a volatile storage 225, such as a random access memory (RAM) or other dynamic storage device, coupled to bus 224 for storing various information as well as instructions to be executed by processor 222. The volatile storage 225 may also be used for storing temporary variables or other intermediate information during execution of instructions by processor 222. Computing unit 201 may further include a read only memory (ROM) or an erasable programmable memory (EPROM) 227 or other static non-transitory storage device coupled to bus 224 for storing static information and instructions for processor 222, such as basic input-output system (BIOS), as well as various system configuration parameters. A persistent storage device or non-volatile memory 226, such as a magnetic disk, optical disk, or solid-state flash memory device may be provided and may be coupled to bus 224 for storing information and instructions.

Computing unit 201 may be coupled via bus 224 to an integral display 221, possibly a touch-screen display, for use in displaying information to a user. If desired, computing unit 201 may be coupled via bus 224 to an external display screen 244. An external input device 243 (e.g., a standard keyboard) may be coupled to bus 224 for communicating information and command selections to processor 222. A cursor control device 242, such as a mouse, a trackball, or cursor direction keys, may be used for communicating direction information and command selections to processor 222 and for controlling cursor movement on display 244. An external storage device 241 may be connected to the computing unit 201 via bus 224 to provide an extra or removable storage capacity for the computing unit 201, which may be used to facilitate exchange of data with other computer systems.

Some of the techniques herein may be performed by computing unit 201 in response to processor 222 executing one or more sequences of one or more instructions contained in the volatile memory 225. Execution of the sequences of instructions contained in a non-transitory memory may cause processor 222 to perform the process steps described herein. In alternative embodiments, specific hard-wired digital circuitry may be used in place of, or in combination with, software instructions to implement the invention.

The term "computer-readable medium" as used herein refers to any medium that participates in providing instructions to processor 222 for execution. The computer-readable medium is just one example of a machine-readable medium, which may carry instructions for implementing any of the methods and/or techniques described herein. Various forms of computer readable media may contain one or more sequences of one or more instructions for the processor 222 to execute, including non-volatile media (storage device 226), and volatile media (storage device 225). Common forms of non-transitory computer-readable media include, for example, a floppy disk, a hard disk, magnetic tape, or any other magnetic medium, a CD-ROM, a flash drive, and a memory card.

The computing unit 201 may thus also include a communication interface, such as network interface card 223 coupled to the data bus 222. Communication interface 223 may provide a two-way data communication coupling to a network link that may be connected to a local network. For example, communication interface 223 may be an integrated services digital network (ISDN) card or a modem to provide a data communication connection to a corresponding type of telephone line, or it may be a local area network interface card (LAN NIC) to provide a data communication connection to a compatible LAN.

Network link 223 also typically provides data communication to other network resources. For example, the network link may provide a connection over the internet 261 to the world-wide-web. Thus, the computing unit 201 can access resources located anywhere using the Internet 261. Also, the computing unit 201 may also be accessed by, or communicate with, other computers (e.g. 262), or another smart device (e.g., smartphone 263), generally with permission, and which may be located anywhere with access to the internet 261.

While illustrative implementations of one or more embodiments of the present invention are provided hereinabove, those skilled in the art and having the benefit of the present disclosure will appreciate that further embodiments may be implemented with various changes within the scope of the present invention. Other modifications, substitutions, omissions and changes may be made in the design, size, materials used or proportions, operating conditions, assembly sequence, or arrangement or positioning of elements and members of the exemplary embodiments without departing from the spirit of this invention.

Accordingly, the breadth and scope of the present disclosure should not be limited by any of the above-described example embodiments, but should be defined only in accordance with the following claims and their equivalents.

What is claimed is:

1. A method for selling and purchasing of a seller's proprietary 3D object design, and for printing of the 3D object by a purchaser on a 3D printer that prevents unauthorized printing, said method comprising the steps of:

creating a print file for the design of the proprietary 3D object using a file format and storing the print file on a server;

creating a smart contract using ethereum blockchain comprising:
  allocating a total supply of ethereum tokens; and
  controlling selling and buying of the seller's 3D object design comprising:
    appending a hash to the print file of the proprietary 3D object; and
    publishing the hash in the Blockchain ledger;

selecting the seller's 3D object on an internet webpage by the purchaser and transferring of a required amount of ethereum tokens from the purchaser to purchase a quantity of prints of the selected 3D object;

streaming of the print file with the appended hash from the server to the printer; sending the hash to the printer; comparing the sent hash to the appended hash in the print file of the proprietary 3D object; and printing only the purchased quantity of prints of the 3D object using the streamed print file when the sent hash matches the appended hash in the print file of the proprietary 3D object; wherein printing of the 3D object comprises sequentially depositing a plurality of layers of material.

2. The method according to claim 1, further comprising: transferring to the seller a royalty being an agreed upon percentage of the required amount of ethereum tokens received from the purchaser.

3. The method according to claim 2, further comprising: collecting a sales commission being an agreed upon percentage of the required amount of ethereum tokens received from the purchaser.

4. The method according to claim 3, further comprising: publishing the royalty and the sales commission in the Blockchain ledger.

5. The method according to claim 4, further comprising: creating a print management network for locating a closest available public printer for completing printing of the 3D object when the purchaser does not have a 3D printer.

6. A system for selling and purchasing of a seller's proprietary 3D object design, and for printing of the 3D object by a purchaser on a 3D printer that prevents unauthorized printing of the seller's proprietary 3D object design, said system comprising:

a server;

a 3D printer configured to build the 3D object by sequential deposition of a plurality of layers of material;

one or more client devices configured to transmit the seller's proprietary 3D object design wirelessly over a network to said server;

wherein said server is configured to receive the seller's transmitted proprietary 3D object design; said server further configured to create a smart contract with ethereum blockchain to control sales and purchases of the seller's 3D object design: wherein said smart contract is configured to append a hash to the print file of the seller's proprietary 3D object and store the print file with the appended hash in a non-transitory memory, and to publish the hash in a ledger of the blockchain;

wherein said server is further configured to sell one or more prints of the seller's proprietary 3D object design on an internet webpage for a required amount of ethereum tokens;

wherein when the purchaser purchases a quantity of prints of the seller's proprietary 3D object design on the internet webpage, said server streams the stored print file with the appended hash to said 3D printer, and separately transmits the hash to the 3D printer;

wherein said 3D printer is configured to compare the transmitted hash to the appended hash in the print file, and to print only the purchased quantity of prints of the seller's proprietary 3D object design when the appended hash in the print file matches the transmitted hash.

7. The system according to claim 6, wherein said server is configured to sell the seller's 3D object to the purchaser for a required amount of ethereum tokens.

8. The system according to claim 7, wherein said server is configured to transfer to the seller a royalty being an agreed upon percentage of the required amount of ethereum tokens received from the purchaser.

9. The system according to claim 8, wherein said server is configured to collect a sales commission being an agreed upon percentage of the required amount of ethereum tokens received from the purchaser.

10. The system according to claim 9, wherein said server is configured to publish the royalty and the sales commission in the Blockchain ledger.

* * * * *